US012811398B2

(12) United States Patent
Brennan et al.

(10) Patent No.: US 12,811,398 B2
(45) Date of Patent: Nov. 24, 2026

(54) METHODS AND SYSTEMS FOR ENERGY MANAGEMENT AND OPTIMIZATION

(71) Applicant: Sol-Ark, LLC, Allen, TX (US)

(72) Inventors: Thomas Joseph Brennan, Richardson, TX (US); Kennedy Echeverry, Carrollton, TX (US); Wojciech Grohman, Frisco, TX (US); Jonathan L. Nesbitt, Wylie, TX (US); Mahir Sukar, Richardson, TX (US)

(73) Assignee: Sol-Ark, LLC, Allen, TX (US)

( * ) Notice: Subject to any disclaimer, the term of this patent is extended or adjusted under 35 U.S.C. 154(b) by 333 days.

(21) Appl. No.: 18/434,009

(22) Filed: Feb. 6, 2024

(65) Prior Publication Data

US 2024/0266828 A1 Aug. 8, 2024

Related U.S. Application Data

(60) Provisional application No. 63/487,754, filed on Mar. 1, 2023, provisional application No. 63/483,526, filed on Feb. 6, 2023.

(51) Int. Cl.
*H02J 3/007* (2026.01)
*H02J 3/32* (2026.01)
(Continued)

(52) U.S. Cl.
CPC .............. *H02J 3/0075* (2020.01); *H02J 3/32* (2013.01); *H02J 3/38* (2013.01); *H02J 7/35* (2013.01);
(Continued)

(58) Field of Classification Search
CPC .... H02J 3/0075; H02J 3/12; H02J 3/38; H02J 7/50; H02J 7/82; H02J 7/933; H02J 7/35; H02J 2101/24; H02J 2103/35
(Continued)

(56) References Cited

U.S. PATENT DOCUMENTS

2011/0082598 A1 4/2011 Boretto et al.
2014/0018969 A1 * 1/2014 Forbes, Jr. ................ G05F 1/66 700/295
(Continued)

OTHER PUBLICATIONS

PCT/US2024/014575, "International Preliminary Report on Patentability", Aug. 21, 2025, 11 pages.
(Continued)

*Primary Examiner* — Md Azad
(74) *Attorney, Agent, or Firm* — Kilpatrick Townsend & Stockton LLP

(57) ABSTRACT

Examples described herein relate to energy management and optimization. An energy management system can monitor a microgrid using sensors associated with a utility grid, one or more power sources, and one or more load devices. The energy management system can determine one or more load profiles corresponding to the one or more load devices based on measurements from the sensors. The energy management system can determine a priority order of the one or more load devices based on a user input or availability of the one or more power sources. The energy management system can then dynamically connect and disconnect the one or more power sources and the one or more load devices based on a utility grid condition, available powers from the one or more power sources, the one or more load profiles, and the priority order of the one or more load devices.

20 Claims, 19 Drawing Sheets

(51) Int. Cl.

| | |
|---|---|
| ***H02J 3/38*** | (2026.01) |
| ***H02J 7/35*** | (2006.01) |
| ***H02J 7/50*** | (2026.01) |
| ***H02J 7/82*** | (2026.01) |
| ***H02J 7/90*** | (2026.01) |
| ***H02J 13/12*** | (2026.01) |
| ***H02J 101/24*** | (2026.01) |
| ***H02J 103/35*** | (2026.01) |

(52) U.S. Cl.
CPC .................. *H02J 7/50* (2026.01); *H02J 7/82* (2026.01); *H02J 7/933* (2026.01); *H02J 13/12* (2026.01); *H02J 2101/24* (2026.01); *H02J 2103/35* (2026.01)

(58) Field of Classification Search
USPC .......................................................... 700/295
See application file for complete search history.

(56) References Cited

U.S. PATENT DOCUMENTS

| | | | | |
|---|---|---|---|---|
| 2019/0348838 | A1 | 11/2019 | Liu | |
| 2020/0395748 | A1 | 12/2020 | Miller et al. | |
| 2021/0402889 | A1* | 12/2021 | Logvinov | B60L 53/66 |
| 2022/0216728 | A1 | 7/2022 | Ashman et al. | |
| 2022/0294222 | A1* | 9/2022 | Winter | H02J 3/14 |
| 2023/0013208 | A1* | 1/2023 | Hastings | H02J 3/32 |
| 2023/0187933 | A1* | 6/2023 | Buttgenbach | H02J 3/003 307/38 |
| 2024/0421601 | A1* | 12/2024 | Prakash | H02J 3/46 |

OTHER PUBLICATIONS

PCT/US2024/014575, "International Search Report and Written Opinion", May 15, 2024, 12 pages.
U.S. Appl. No. 18/642,691, "Non-Final Office Action", Apr. 24, 2026, 28 pages.

* cited by examiner

METHODS AND SYSTEMS FOR ENERGY MANAGEMENT AND OPTIMIZATION

CROSS-REFERENCES TO RELATED APPLICATIONS

This application claims priority to U.S. Provisional Patent Application No. 63/483,526, filed Feb. 6, 2023, entitled "SELF LEARNING LOAD MANAGEMENT," and U.S. Provisional Patent Application No. 63/487,754, filed Mar. 1, 2023, entitled "HOME ENERGY SOURCE ROUTER AND LOAD OPTIMIZER," both of which are hereby incorporated by reference in their entireties for all purposes.

BACKGROUND OF THE INVENTION

Distributed energy sources (DER), such as roof-top solar panels, batteries, and fossil-fuel generators, are transforming the electric power grid, especially how electricity is generated, transmitted, and consumed. DERs can be installed to provide power to load devices in a certain area, such as a neighborhood, an industrial plant, a building, or a house. The DERs and the load devices at a given location can form a microgrid. The microgrid can be connected to the utility grid to draw electricity from or supply electricity to the utility grid. The microgrid can also be disconnected from the utility grid and operated independently of the utility grid. Despite the progress made in the areas of energy management, there is a need in the art for improved methods and systems related to load management and energy optimization.

SUMMARY OF THE INVENTION

The present disclosure generally relates to methods and systems for managing the loads and power sources in a microgrid system. More particularly, embodiments of the present invention relate to an energy management system that can be used to optimize electrical loads and route energy from power sources in a microgrid, such as a home energy grid. The invention is also applicable beyond homes and may be employed in other residential, commercial, or industrial settings where multiple power sources may be installed to provide power supply to multiple loads.

Some examples described herein involve an energy management system that can include one or more relay boards, a microgrid interconnection device (MID) board, a control board, a battery, a neutral forming transformer (NFT), and one or more microcontroller units (MCUs). The energy management system can communicate with and manage various power sources and loads in a microgrid. The power sources can include solar panels connected to the microgrid, batteries with integrated or separate inverters, and backup generators. The microgrid can also be connected to or disconnected from a utility grid. The energy management system can be customized for a specific microgrid to optimize load and sources and provide efficient backup energy with a fast response time in different scenarios. The energy management system can learn a load profile for each load and add or shed loads based on the load profile, to avoid overloading electrical inverters connected to the solar panels and or battery energy storage systems (BESS). In a learning mode, the energy management system can learn peak and steady state loads in the microgrid over a predetermined time interval (e.g., every week, every two weeks, every month, and seasonal) and use that information to generate the load profiles. Machine learning models can also be used to generate the load profiles, including peak load, steady state load, etc. In an execution mode, the energy management system can add or shed certain loads based on the load profiles, load priorities, grid conditions, and/or messages from a grid operator. The energy management system described herein reduces the probability of the electrical inverter becoming overloaded, which in turn reduces the likelihood that the electrical inverter is shut down. Through this process, the load and supply in a microgrid or other microgrids can be optimized.

The one or more relay boards include relay switches operable to connect a load or source to the microgrid or disconnect a load or source from the microgrid. In some examples, the energy management system can monitor relay temperatures to detect relay degradation or failure. The temperature associated with a relay can reflect the impedance of the relay. The higher the temperature or temperature increase is, the higher the impedance of the relay may be, which can indicate that the contact of the relay is deteriorating. If the relay temperature increases above a predefined threshold, it can indicate an abnormal condition in the relay, either degradation or an imminent failure. The energy management system can determine that the relay's temperature meets or exceeds the predefined threshold and responsively generate and transmit an alert message to a user or operator associated with the microgrid to execute certain mitigation measures. The energy management system can also generate a control message to open or isolate the relay switch.

In some examples, a relay board is a modular board that can be easily added or removed from the energy management system. The relay and sensing board can include a fixed number (e.g., 4) of relay switches. If one relay switch on a relay board fails, a spare relay and current sense channel can be used instead, or the whole relay board can be quickly and easily replaced. This may simplify maintenance and upgrading processes. Each relay channel may include voltage, current, and temperature monitoring.

In some examples, the energy management system can employ zero-crossing switching, which can prevent arcing. Since arcing can cause relay pitting (e.g., damaging relay contacts), preventing such arcing can help elongate the lifespan of the relays. Zero-crossing switching can involve switching on or off a relay when the current or voltage is zero or substantially zero. However, it can be difficult to coordinate the switching of the relay with the zero-crossings, because relays do not open and close instantaneously. Rather, they can take a small amount of time to open or close, and that small amount of time is variable. As a relay ages, its springs can get loose over time, which can also cause the closing or opening time of the relay switch to change (e.g., get slower). In some cases, it may take 0.25-2.5 60 Hz cycles to open or close a relay switch from the time a signal to open or close the relay switch is transmitted. Meanwhile, for inductive or capacitive loads, the current and voltage are out of phase. To account for these and other challenges, in some examples, the energy management system can implement an autocalibration algorithm to predict how far in advance it needs to transmit an open/close signal to coordinate the opening/closing of the relay with a zero-crossing. This can help ensure that, as the relays age and their switching times change, they can still be opened/closed sufficiently in sync with the zero-crossings to avoid arcing.

In some examples, the energy management system can include a current sensor coupled to a relay switch to measure the current in a corresponding connected load circuit or power source. In some cases, current sensors (e.g., hall effect current sensors) can be more accurate in higher temperatures. If the ambient temperature of the current switch is lower than 25° C., especially in cold regions, the current sensor may not operate as accurately. At or above 25° C., the higher the ambient temperature is, the higher the accuracy level can be until an upper limit is reached at which the current sensor becomes damaged. Some examples take advantage of these principles to optimize the placement of the current sensor. For instance, the current sensor can be placed closer to the relays and heated by the heat generated at the relay switches, especially in cold regions, but not too close to damage the current sensor. An optimal distance between a current sensor and a coupled relay switch can be determined based on climate data and a thermal trend of the coupled relay switch.

The energy management system automatically detects degradation in the state of health of an internal backup battery. This internal battery in the energy management system is operable to power the control board and powers additional features. The battery can be tested periodically (e.g., quarterly) to determine whether it needs to be replaced or has degraded. This testing can involve slowly draining the battery to verify its capacity. For example, the draining process can be compared with prior records. The electronics or software needed for the testing can be integrated into the control board of the energy management system.

The energy management system can be configured in an enclosed panel. In some examples, the enclosure of the energy management system can be used as a thermal sink for the one or more relay boards and the MID board in the energy management system. For example, a relay board can be mounted to the enclosure through thermal pads. The one or more relay boards and the MID board can get much hotter than the integrated circuits on the control board. To protect the control board and improve its longevity, the control board can be separated from the relay boards and the MID board so that the control board can be thermally insulated from the other parts of the energy management system. For example, the control board can be mounted vertically to the relay boards and the MID board at a distance.

According to one embodiment of the present invention, an energy management system can include one or more relay switches configured to connect with one or more power sources or load devices in a microgrid correspondingly, a microgrid interconnection device configured to connect with or disconnect from a utility grid, and one or more microcontroller units. The one or more microcontroller units can include a communications interface, a non-transitory computer-readable medium, and one or more processors communicatively coupled to the communications interface and the non-transitory computer-readable medium. The one or more processors can be configured to execute processor-executable instructions stored in the non-transitory computer-readable medium to monitor the microgrid using multiple sensors associated with the utility grid, the one or more power sources, and the one or more load devices; determine one or more load profiles corresponding to the one or more load devices in the microgrid based on measurements from the multiple sensors; determine a priority order of the one or more load devices in the microgrid based on a user input or availability of the one or more power sources; and dynamically connect and disconnect the one or more load devices and the one or more power sources based on a utility grid condition, the one or more load profiles, and the priority order of the one or more load devices.

According to one embodiment of the present invention, an energy management system can perform automatic identification of the phase of the supply voltage that each connected load operates on. The energy management system can monitor changes in the load current at a load and correlates the load current change to the changes sensed on each phase of the supply voltage. The change correlation observed over a certain limited period can indicate the phase each controlled load is connected to. The phase identification can facilitate load shedding to phase balance. Similar, albeit a more expensive solution would rely on measuring the voltage of each load to determine which phase it is on. However, the voltage sensing solution is less advantageous as it requires extra voltage sensing on each load input.

Another embodiment of the present invention includes a method executed by an energy management system connected to a microgrid. The energy management system can include one or more relay switches connected with one or more power sources or load devices in a microgrid correspondingly, a microgrid interconnection device configured to connect the microgrid with or disconnect the microgrid from a utility grid, and one or more microcontroller units. The method can include monitoring the microgrid using multiple sensors associated with the utility grid, the one or more power sources, and the one or more load devices. The method can include determining one or more load profiles corresponding to the one or more load devices in the microgrid based on measurements from the multiple sensors. The method can include determining a priority order of the one or more load devices in the microgrid based on a user input or availability of the one or more power sources. The method can include dynamically connecting and disconnecting the one or more power sources and the one or more load devices based on a utility grid condition, weather, environmental conditions, time of day, date, day of week, month, year, available powers from the one or more power sources, the one or more load profiles, and the priority order of the one or more load devices.

Yet another embodiment of the present invention includes a non-transitory computer-readable medium. The non-transitory computer-readable medium can include processor-executable instructions configured to cause one or more processors to monitor the microgrid using multiple sensors associated with a utility grid, one or more power sources in a microgrid, and one or more load devices in the microgrid, determine one or more load profiles corresponding to the one or more load devices in the microgrid based on measurements from the multiple sensors, determine a priority order of the one or more load devices in the microgrid based on a user input or availability of the one or more power sources, and dynamically connect and disconnect the one or more power sources and the one or more load devices based on a utility grid condition, weather, environmental conditions, time of day, date, day of week, month or year, available powers from the one or more power sources, the one or more learned load profiles, and the priority order of the one or more load devices.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete, and will fully convey the full scope to those skilled in the art.

DETAILED DESCRIPTION OF THE INVENTION

Figure 1A:
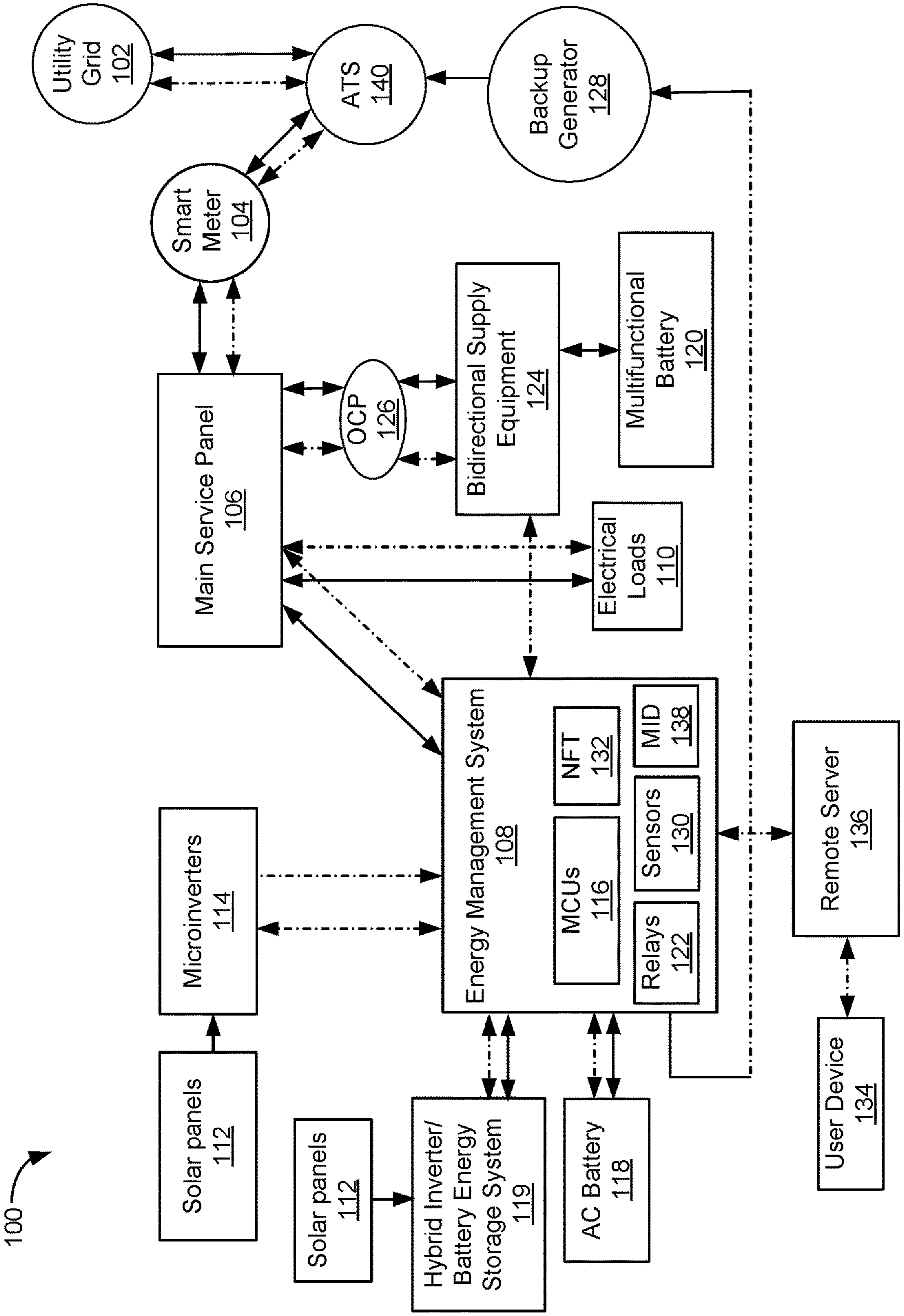
FIG. 1A illustrates a block diagram of an example of a microgrid with an energy management system according to some aspects of the present disclosure.

The present disclosure relates generally to methods and systems related to energy management. More particularly, embodiments of the present invention provide systems and methods for energy management and optimization. A number of power sources can be dynamically routed to prioritized loads in a microgrid for a home or building, where the prioritization of the loads can be designated by a user, a learning algorithm, or combination of both. Some embodiments of an energy management system can communicate with and manage various power sources and loads dynamically via communication in different scenarios such as on-grid, off-grid, inclement weather conditions, etc. The system balances most loads with one or multiple available power sources and provides efficient power backup for the whole home or building with fast response time by dynamically controlling the power sources and load. In some examples, the microgrid is a home energy system, and the energy management system is a home energy router and optimizer (HERO). While some embodiments are described herein with reference to an energy management system in a home, it will be appreciated that embodiments are widely applicable to any building or structure in which multiple sources and loads may be installed, including various applications in residential, commercial, or industrial settings.

Load management is the process of efficiently managing the available power of a building with or without an electrical inverter, where the available power is first supplied to the prioritized loads and then to other loads. The priority of the loads may be set based on a user's choice, such as what loads the user wants to use even when the grid is down. An inverter can convert direct current (DC) electricity generated from solar panels or other energy sources to alternating current (AC) electricity to power certain loads in an energy system, such as a home or a building. Current solutions involve a user performing load management, such as an operator manually setting the load and then performing the load management (e.g., by manually connecting or disconnecting certain loads) based on the user input. However, this manual method is time-consuming, dangerous, and tedious, and fails to efficiently use the available power and can inappropriately cause the inverter to overload and shut down.

The present disclosure provides an energy management system that can learn load profiles and automatically add and shed electrical loads on an inverter that supplies electric power to an electric system, for example when normally available utility power is interrupted or otherwise unavailable or disconnected. An energy management system can optimize the energy within a home or building, which includes various types of loads and energy sources, based on self-learned load profiles, load priorities, grid connection conditions, and grid messages.

Accordingly, various aspects of the present disclosure can enable the prioritization of electrical loads based on self-learned load profiles. The energy management system can be programmed to automatically follow iterative cycles based on the load information and feedback regarding the particular cycle to efficiently conduct load management. This reduces the processing power of the load management system and reduces the probability of the electrical inverter becoming overloaded, reducing the likelihood the electrical inverter is shut down. The need for installing a prioritized load panel can be eliminated.

FIG. 1A illustrates a block diagram of an example of an energy management system 108 in a microgrid 100 according to some aspects of the present disclosure. The microgrid 100 illustrated in FIG. 1A can be a microgrid including one or more power sources (e.g., a utility grid 102, solar panels 112, an AC battery 118, a hybrid inverter/battery energy storage system 119, a multifunctional battery 120, and a backup generator 128), a plurality of electrical loads 110, a main service panel 106, and an energy management system 108.

In some examples, the power source is the utility grid 102, one or more of a plurality of solar panels 112 with microinverters 114, an AC battery 118 that can be implemented as a standalone AC battery, a hybrid inverter/battery energy storage system 119, a multifunctional battery 120, or a backup generator 128, some or all of which can be optional to the microgrid 100. In some examples, the AC battery 118 includes an integrated or separate stationary inverter. The AC battery 118 can be charged from microinverters 114 connected with solar panels 112 or from the utility grid 102 at low-cost time-of-use (TOU). The multifunctional battery 120 can include an integrated or separate inverter and can supply energy to the loads in the microgrid 100 via bidirectional supply equipment 124. The bidirectional supply equipment 124 can be connected to a multifunctional battery 120 that can be charged from or discharged to the microgrid 100 or the utility grid 102 via the main service panel 106 with overcurrent protection (OCP) 126. The OCP 126 can be part of the main service panel 106. Alternatively, the OCP 126 can be part of the energy management system 108. The multifunctional battery 120 can be a stationary battery or a mobile battery, an inverter coupled with the battery, or other electrical equipment. The backup generator 128 can be a backup, stationary, fuel-powered generator. The backup generator 128 and the utility grid 102 can be connected to the main service panel 106 via an automatic transfer switch (ATS) 140. In some examples, the microgrid 100 only has a single power source. In other examples, the microgrid 100 includes more than one power source. If more than one power source is included, the microgrid 100 may include multiple power sources of the same type, or may otherwise include any combination of power sources to sufficiently provide power. The energy management system 108 is operable to communicate with and control the power sources and the plurality of loads. For example, the energy management system 108 can send commands to dynamically control one or more of the power sources or the plurality of loads of the local power network via a suitable communication channel. The main service panel 212 can include an automatic transfer switch operable to disconnect the local power network, e.g., the microgrid 100, from the utility grid 102. Accordingly, these power sources can reduce grid dependence and utilize lower-cost grid times (e.g., having lower time-of-use rates) for actions such as throttled electrical device charging, while maintaining power delivery to prioritized loads.

The microgrid 100 can include a battery energy storage system (BESS). In some examples, the BESS includes an AC battery 118 with an inverter. In other examples, the BESS includes an AC battery 118, i.e., a stationary AC battery, with a hybrid inverter. In some examples, the BESS includes a hybrid inverter/battery energy storage system 119. The hybrid inverter in the hybrid inverter/battery energy storage system 119 can include one or more inverters connecting with one or more solar panels and an inverter connecting to a battery. The hybrid inverter can connect to the energy management system 108 to provide energy to the microgrid 100 or draw energy from the microgrid. Thus, the microgrid 100 can include the AC battery 118 or the hybrid inverter/battery energy storage system 119 with a DC battery. In some implementations, both the AC battery 118 and the hybrid inverter/battery energy storage system 119 are utilized. In some embodiments, the solar panels 112 are connected to the hybrid inverter/battery energy storage system 119 to provide power to the hybrid inverter/battery energy storage system 119.

In some examples, the BESS includes a multifunctional battery 120 with a coupled inverter that supplies power to a microgrid through bidirectional supply equipment 124. The multifunctional battery 120 has multiple purposes or functions, for example, providing power or energy to the microgrid 100, storing power or energy received from the microgrid, and providing power or energy to different devices (e.g., vehicles, machines, etc.) outside the microgrid, or storing energy generated from certain sources outside the microgrid. The multifunctional battery 120 can be mobile or fixed. Mobile batteries may be standalone portable AC or DC batteries, mobile generator batteries, electric vehicles with batteries and the like. The multifunctional battery 120 can be coupled with certain power regulation devices (not shown) before connecting to the bidirectional supply equipment 124. The power regulation devices can include a DC-DC converter, a buck converter, a boost converter, a buck-boost converter, or a DC-AC inverter. The power regulation devices can be integrated with the multifunctional battery or have separate packages. The power regulation devices can be mobile or fixed. In some examples, solar energy is harvested by solar panels to power the electrical loads 110 via microinverters 114. Excess harvested energy can be stored in the AC battery 118 or the multifunctional battery 120. The bidirectional supply equipment 124 in the microgrid 100 can provide fast or slow charging to multifunctional battery 120. For example, the bidirectional supply equipment 124 is capable of providing DC 25 kW fast charging to a 3-phase 30 kW inverter and its 200-800 VDC battery pack. In another example, residential directional supply equipment with bi-directional power flow may include a 15-20 kW split-phase (2 phase) inverter with a paired 300-500 VDC battery.

In some examples, the microgrid 100 further includes a remote server 136, such as a cloud or web-based server, and a user device 134. The user device 134 includes a user interface that presents an application. When presented on the user device 134, the application enables a user to monitor various data of the microgrid 100, including one or more circuit loads, total managed loads, and total loads of the building; to set load priorities among the loads; and to override and force a load circuit to be connected or disconnected. The remote server 136 receives load records that are logged to and stored in a remote database. In some examples, the microgrid 100 supports remote firmware updates of all its relevant components.

The user device 134 can be a mobile electronic device (e.g., a mobile phone or smart watch), tablet, laptop, and so forth, and enables the energy management system to be monitored and/or manually updated. For example, the application can receive an input via the user interface to add or reduce a load for the system. In some examples where manual intervention is not received via the application, the energy management system operates in a self-programming mode as described below that includes the learning mode and execution mode. In some examples, the application can be presented on a user interface of a connected user device to enable the load shed process, load adding process, power source supply, or battery charging and discharging process to be manually controlled. In some examples, the prioritization is set by default and can be updated by a user to prioritize different loads or connected devices, appliances, and so forth.

The energy management system 108 can command routing to drive time-shifted loads with stored energy from the multifunctional battery 120 or the AC battery 118, which may be optional and may be stationary. The energy management system 108 can perform energy control optimization with distributed device commands to achieve backup power to priority loads, longer operational time, net-zero metering, grid load peak-shaving, and management of time-of-use optimized charging of the multifunctional batteries. In addition, the energy management system 108 can decode utility Automated Demand Response (ADR) remote control messages to route energy and optimize loads, such as charging throttling and time-of-use, grid net-zero meter, grid meter peak-shaving, generator and heating, ventilation, and air conditioning (HVAC) control.

The energy management system 108 includes one or more microcontroller units (MCUs) 116, multiple sensors 130, relays 122, and a microgrid interconnection device (MID) 138. The energy management system 108 can also include one or more regulators, such as a 12 V regulator. In some examples, the energy management system 108 is connected to the utility grid 102 via the MID 138. The MID can be configured to connect or disconnect the microgrid 100 from the utility grid 102. Each relay may include an up position and a down position that can be manually or automatically set. In the down position, the relay is forced closed. In the up position, the relay is controlled automatically or by settings input through a user interface, such as a graphical user interface (GUI) on the user device 134. The one or more MCUs can include a main MCU and a network MCU. The main MCU can include a power monitor component that monitors the power of the microgrid 100 and provides load management, either automatically or at the direction of the user via the application presented on the GUI of the user device 134. The network MCU can be configured to manage the network communications between the main MCU and the microgrid 100. In some examples, the energy management system 108 implements a dual MCU circuit board including circuit lugs connected to multiple sensors 130 and relays 122 for controlling electrical loads and power sources along with AC power measurement in various ranges of AC power. For example, the energy management system may include 14 circuit lugs connected to 14 current sensors and 14 relays (e.g., 100-Amp relays). The MCUs 116 may further include control logics for the backup generator 128, the microinverters 114, the AC battery 118, and the plurality of electrical loads 110 based on the conditions of the power sources and electrical loads in the microgrid 100, grid status, and/or request messages from grid operators. For example, the MCUs 116 can enable load shedding for loads deemed low priority when the grid is down to prevent inverter overload shutdown.

The energy management system 108 can include communication capability, for example, IEEE 802.11 Wi-Fi and IEEE 802.3 Ethernet capability. The energy management system 108 can further include instrumentation electronics that enable filtering and measurements for building current from two current transducers (CT) (e.g., current sensors) and two building voltage sensors. Some of the relay channels in the energy management system 108, for example, the top four relay channels, may include voltage sensing ability. In some examples, the energy management system 108 includes a main communications port used for control messages and other kinds of messages, for example to receive settings and user commands from a remote server 136 and to send setting changes and instrumentation measurements to the remote server 136. For example, the main communications port may be a Modbus Remote Terminal Unit (RTU) RS-485 for half-duplex mode communication. In some examples, the energy management system 108 uses IEEE 802.3 Ethernet and its power delivery schemes to control the bidirectional supply equipment 124. The energy management system 108 can further include a neutral forming transformer (NFT) 132 that creates a split-phase to provide power to the building loads that require two-phase power.

In some examples, the energy management system 108 monitors relay temperature relative to ambient temperature, using a temperature sensor. The temperature sensor can be coupled to a relay switch. A thermal trend can be determined. If the relay temperature increases above a threshold, it can indicate a problem in the relay, for example degradation or an imminent failure. An alert message can be generated and transmitted to the control circuit or the system operator to execute certain mitigation measures, for example disconnecting the load. For instance, if the relay temperature is at or above the 95th percentile of the thermal trend over a prolonged period (e.g., several days or months) while the current and voltage are in their typical ranges, it can indicate the relay switch has certain issues (e.g., deterioration). The temperature increase of the relay may reflect the increased impedance (e.g., resistance) of the relay. The higher the temperature or temperature increase is, the higher the impedance of the relay may be, which can indicate that the contact of the relay is deteriorating.

In some examples, the relays 122 in the energy management system 108 are configured for zero-crossing switching. Zero-crossing switching can involve opening and closing the relays when the current and voltage values, respectively are approximately zero. Zero-crossing switching can help prevent arcing, which can cause relay pitting (e.g., damaging relay contacts). Because springs in a relay can get loose over time (e.g., due to aging), the closing or opening time of the relay switch can change (e.g., get slower). For example, if the relay switch is aged, it takes longer for the contacts to open or close. Meanwhile, for inductive or capacitive loads, the current and voltage are out of phase. The energy management system 108 can anticipate the zero-current time or zero-voltage time for the relay switch and determine a time at which to transmit the opening or closing signal based on the delays at the relay switch, to account for these delays in the relay switching time. If the relay switch is in good condition, the opening or closing time can be shorter. If the relay switch is aged or deteriorated, the opening or closing time can be longer. Generally, it can take 0.25-2.5 cycles to open or close a relay switch from the time a signal to open or close the relay switch is transmitted. The energy management system 108 can implement an autocalibration system and method to predict opening or closing times to account for these switching delays, to open the relay switch at zero current and close the switch at zero voltage. For example, actual zero-current crossing time stamps together with arc current from opening a relay switch can be logged and then compared for predicting zero-current crossing times and opening arc currents. The error between the predicted arc-current value and the actual arc-current value can be provided to a predictive arc minimizer to update control time prediction, which can minimize the arc current and maximize the relay lifetime.

Various inverters can be used in the energy management system 108, for example microinverters 114 converting DC energy from the solar panels 112 to the AC battery 118, the inverter integrated with the AC battery 118, or an inverter integrated with the multifunctional battery 120. Microinverters are known for their simple installation. They are also cost-effective, enable the user to have solar panel-level power monitoring, and are suitable for grid-tied solutions. Systems with microinverters can also be used in off-grid scenarios if they are alternating current (AC) coupled, but these AC coupled systems are slow in response during backup scenarios (e.g., where backup power is supplied to loads). During a backup scenario, the battery inverter establishes the 60 Hz waveform on the AC bus. Additional power needed by the AC load can come from the AC battery 118 inverting direct current (DC) to the building AC bus for the loads. If the solar panels 112 produce more power at microinverters 114 than required by the AC loads, this surplus power can flow to the AC battery 118 through the inverter charger through a maximum power point tracking (MPPT) device. However, when the batteries are full, to ensure the battery does not get overcharged, the power produced at the panel level can be throttled down or shut down. Further, some electrical devices, such as backup batteries, may be charged at low-cost times, such as from microinverters 114 connected with solar panels 112 or from the utility grid 102, so as to not overload the grid or incur excessive cost of charging. Utilities seek peak load reduction and can command time shifting of some loads to non-peak times or command a microgrid to zero its own meter during peak times or to keep its meter below a peak load.

Existing frequency-shifting approaches (e.g., frequency-Watt approaches) for controlling microinverters 114 may have a slow response when the microinverter reduces its output power. Where the microinverters 114 are shut down, they may need to wait for at least a predetermined period, such as five minutes, before turning on once the grid frequency gets stabilized. During this time, the AC loads of the building can be powered from the BESS. Other solutions include using a diversion load to avoid microinverter shutdown. However, this approach of frequency-based control of microinverters is inefficient and involves delay in response. Thus, current solutions for controlling microinverters 114 typically include waiting a predetermined amount of time before turning back on, requiring power from a BESS, or using a diversion load, which is inefficient and involves a delayed response, particularly during off grid scenarios or during cloudy environments. In contrast, the energy management system 108 of the present disclosure can have an improved response during backup scenarios and therefore provides efficient backup power to avoid microinverter overloading and shutdown. The energy management system 108 can continuously monitor the grid condition, the power sources, and the electrical loads to control and route power sources to prioritized loads. For example, the bidirectional supply equipment 124 connected to the multifunctional battery 120 via an inverter can enable bidirectional power flow to power the electrical loads 110 in the microgrid 100, during unstable grid scenarios.

In some examples, the energy management system 108 can use electronic communication means to dynamically control power generation sources and loads. For example, the energy management system 108 can send a command via a communication channel to a power source, such as one or more of the microinverters 114, AC battery 118, or bidirectional supply equipment 124, to power the home loads when the grid is unstable or costly. The command or commands may be sent through any suitable communication channel to microinverters 114 to throttle power generation or control the power export (e.g., rather than shutting down the microinverters 114). Electronic communication as described herein may include wired or wireless communication, such as IEEE 802.11 Wi-Fi, Bluetooth communication, Near-Field Communication, and so forth. In some examples, the energy management system 108 sends a command via any suitable communication channel to export the power generated by the microinverters 114 to power low priority loads, as long as surplus power is available from the microinverters 114. In some examples, battery charging via the bidirectional supply equipment 124 can be throttled down as needed by Modbus commands from the energy management system 108 to help ensure that the home load needs are met. Some examples further include Time-Of-Use (TOU)-based charging to charge the multifunctional battery 120 at lower-cost times. In some examples, the communication channel message, or command, has a payload packet portion of size ranging from 42 to 1500 octets with a 32-bit cyclic redundancy check (CRC) value. In other examples, the message may have a 2-octet payload and a 16-bit CRC value for message integrity.

In some examples, the microgrid 100 can achieve grid load net-zero metering when commanded by a user or utility's ADR system while alternate energy sources possess sufficient power levels. In some examples, the microgrid 100 can achieve grid load meter peak-shaving when commanded by the user or utility's ADR system while alternate energy sources possess sufficient power levels. The load offset may be fixed or specified by the ADR system. When the grid voltage is unstable and any of the inverter AC sources are near their output power limits, the energy management system 108 can automatically disconnect lower priority loads to attempt to maintain loads levels below source levels of power. In some examples, the energy management system 108 can throttle down the charging current at the bidirectional supply equipment 124 when that power is needed by the microgrid or when the electric utility invokes an ADR event. In some examples, ADR is demanded by electric utility cloud servers and responded to by the bidirectional supply equipment 124 and the inverter connected with the multifunctional battery 120. If the electric utility requests grid load peak-shaving, the multifunctional battery 120 can be used to provide power to the loads in the microgrid or the utility grid on demand to reduce grid peaks. If the electric utility requests grid net-zero metering operation, the multifunctional battery 120 can be used to provide power to the loads in the microgrid and reduce costly times of use when grid energy is more expensive.

In some examples, the energy management system 108 communicates with a smart meter 104 and checks the grid stability using voltage and current sensors provided at the smart meter 104. If the energy management system 108 determines that the grid is unstable, the energy management system 108 can send a command to disconnect the microgrid 100 from the utility grid 102 using an ATS. The ATS can be installed in the main service panel 106. Alternatively, the energy management system 108 is connected to the utility grid 102 via the MID 138 installed in the energy management system 108 and smart meter 104. The microgrid 100 can be disconnected from the utility grid 102 using the MID 138. The energy management system 108 can check the grid stability after a specific duration of time, such as every 4.2-5 milliseconds, with the help of grid current and grid voltage sensors coupled to the one or more MCUs 116. These checks may comprise analog measurements. For demand response using distributed energy resources, the energy management system 108 can command power flows to respond to electric utility needs by building load peak shaving, zeroing the meter, and/or exporting power to the electric utility grid at specific power levels which may or may not be preplanned fixed values.

The energy management system 108 can control energy sources in the microgrid 100. In some examples, the one or more MCUs 116 of the energy management system can generate and send a command to microinverters 114 connected with the solar panels 112. The command can be configured to quickly throttle down the power export, for example when loads are reduced, or ramp up the power export, for example when loads are increased. Thus, the power export may be throttled down quickly (e.g., in tens of milliseconds) to allow the microinverters 114 to transition from peak power to steady state power profiles quickly, or may be ramped up quickly (e.g., in tens of milliseconds) to adapt to peak power profiles quickly.

The energy management system 108 can further monitor (e.g., via sensors 130) the power output of the microinverters 114 and quickly throttle loads down based on available power from the power sources. In some examples, the energy management system 108 continuously checks for grid stability at regular intervals with the help of grid current and voltage sensors coupled to the microcontroller in the energy management system 108, with analog measurements, or the smart meter 104. In some examples, the regular interval is every 4.2 milliseconds or every 5 milliseconds. However, these example intervals are presented as examples only and should not be construed as limiting. The intervals may be more frequent than every 4.2 milliseconds, between 4.2 and 5 milliseconds, or less frequent than every 5 milliseconds without departing from the scope of the present disclosure.

In some examples, the energy management system 108 is configured for smart power management. A smart power management module can be implemented in the one or more MCUs 116. The smart power management module can include one or more load learning algorithms. The smart power management module also includes algorithms or logic for managing the power sources and loads. In some examples, the load circuits connected to the energy management system include a set of load circuits and a set of power sources. In some examples, the one or more load learning algorithms can include a machine learning (ML) model or an artificial intelligence (AI) tool that can use a feedback loop to self-learn one or more load management techniques described herein.

The one or more load learning algorithms can learn load profiles of the electrical loads 110. The energy management system can execute load controls, such as adding or shedding loads, based on self-learned load profiles. Certain energy sources, for example solar panels 112, can also be connected to the energy management system 108, for example via microinverters 114, for smart control. The energy management system 108 can connect with multiple load circuits, for example tens or hundreds of load circuits, via relay switches.

In instances where the utility grid goes down or otherwise not connected, the microinverters 114 connected with the solar panels 112 may supply electricity to the loads in the microgrid 100. The energy management system 108 is operable to receive a power supply value of electrical power available from the solar panels 112 connected with the microinverters 114. In some examples, the energy management system 108 is further operable to receive electrical load values corresponding to the plurality of electrical loads 110. The electrical load values can be provided in a batch, such as by a single input for each load in the plurality of electrical loads, or individually for each respective load.

As noted above, current energy management solutions require a user input that provides the load values, which results in inefficient use of the available power. Other solutions shed an electrical load on an electrical generator, rather than an electrical inverter. The energy management system 108 in the present disclosure enables loads to be managed automatically by being added to or shed from the electrical inverters (e.g., microinverters 114, an inverter coupled with the AC battery 118, and/or an inverter coupled with multifunctional battery 120), thereby avoiding overloading of the inverters that power the microgrid 100. The energy management system 108 can automatically manage electrical loads to prevent overloading of the electric inverters by selectively adding or shedding loads based on a load profile for each load, along with other data, such as load priority, grid connection condition, and grid messages.

The energy management system 108 can enable building owners to reduce unnecessary loads or power up additional devices or systems, such as additional appliances, without the need for additional inverters or batteries. In some examples, the energy management system 108 is provided downstream from a main service panel 106 and allows appliances to be disconnected or connected by an included smart relay. The smart relay can receive commands, such as open and close commands, from the one or more MCUs 116 of the energy management system. For example, an open command can be issued under a user software forced mode or by automated selection based on user load priority designation and automatic load analysis for multiple building loads.

In some examples, the energy management system 108 includes a learning mode and an execution mode. In the learning mode, the energy management system 108 learns the load profile for each load with the help of load signatures which are derived from various power consumption parameters. Examples of the power consumption parameters include instantaneous power (Pnow), average power over a recent extended period (Pavg), average power over a most recent period (Pon), maximum power over a most recent period (Pmax), and peak power during previous cycles of starting power surge (Ppk). In some examples, Pnow measures the most recent root mean square (RMS) power; Pavg measures the average power over a recent longer time period, such as twelve, twenty-four, or forty-eight hours; Pon measures the average power over a more recent period, such as the last minute, five minutes, or ten minutes; Pmax measures the maximum power over a recent shorter time period, such as the last minute, five minutes, or ten minutes;

and Ppk measures the peak power utilized during the previous N cycles, such as the previous six cycles, of starting a power surge. These and other parameters can be measured via one or more sensors of the energy management system 108 or the smart meter 104 in the microgrid 100.

A unique consumption pattern (e.g., load signature) can be derived based on the various power consumption parameters over a period of time. The load profile for each load may be learned based on the derived load signature. The load profile can include an identification of the load, a load curve over time, and other suitable information for describing the load. The identification of the load can be predicted based on the load signature or the identification of the load circuit which the load belongs to. A load level of the microgrid can be determined by generating a sum of certain parameters (e.g., the peak power) corresponding to all the loads in the microgrid 100. The load level of the microgrid 100 may exceed the capability of the microinverters 114. A threshold, such as ninety percent of the capability of the electrical inverter, can be set for monitoring the loads. When the threshold is reached, in an execution mode the energy management system 108 executes one or more load shed processes to mitigate and avoid extreme loads being placed on the microinverters 114.

The remote server 136 can include or be connected with a remote database for storing data associated with the microgrid 100. For example, data stored in the remote database can include load measurements by the sensors 130 in the energy management system 108 for the load circuits connected to the relay switches in the energy management system, certain measurements (e.g., currents) by the smart meter related to grid power supply to the microgrid 100, and load profiles corresponding to the loads in microgrid 100. The energy management system 108 can analyze average power utilized over different times and power levels over a certain period of time based on the energy data collected from the load circuits in real time or stored in the remote database. In some examples, the period of time is one week, two weeks, one month, and so forth. In some examples, the period of time includes a rolling window, such as two weeks in a rolling window. The energy management system 108 can receive values of parameters and the load signatures, which can be used by the energy management system 108 to self-program (e.g., once the load signatures are approved and prioritized by a user). Based on the self-programming, load management is conducted so that the electrical inverters are not overloaded and the microgrid 100 is set up with the correct settings and wiring. Where the energy management system 108 is performing self-programming and conducting load management, the electrical loads 110 may be connected in priority and disconnected in the same priority or a different priority.

In some examples, the energy management system 108 implements a trained machine learning (ML) model to learn the load profile at each load circuit. The trained ML model can be running on an MCU of the energy management system 108 or a remote service, which may be executed on the remote server 136 or elsewhere. The ML model can be a classification model, an artificial neural network (ANN), a support vector machine (SVM), a linear regression model, an extreme gradient booting model, a Long Short-Term Memory (LSTM) model, a tree-based model, an autoregressive model, a K-Nearest Neighbors (kNN) algorithm, or any other suitable ML models or the combinations thereof. The ML model can be trained on the remote server 136 based on historical data collected from the load circuits connected to the energy management system 108 in the microgrid 100. Alternatively, or additionally, the ML model can be trained on the energy management system 108 based on historical data collected from the load circuits connected to the energy management system 108. The historical data used as training data can include historical current measurement data or historical power measurement data. Alternatively, or additionally, the ML model can be trained based on data collected from other customers. The training data from other customers can include historical current measurements or power measurements for different loads at other customers. In some examples, an ML model can be trained to identify a load profile, for example including a load type and a load curve over a period of time. For example, the trained ML model can identify what appliance is in a load circuit and a load curve over 24 hours in different seasons. In some examples, the location of the circuit can also indicate what appliances are connected to the load circuit. For example, if the load circuit corresponds to the kitchen, the trained ML model can use such information and the data pattern to infer that the load circuit includes kitchen appliances, such as a stove, microwave, refrigerator, etc.

In some examples, the energy management system 108 uses a trained ML model to optimize the load and energy of the microgrid 100. The energy management system 108 analyzes load and system data to continually monitor and update the load profile for each load. For example, in some instances, the microinverters 114 may shut down due to becoming overloaded. The trained ML model analyzes load data to determine how and why the system was overloaded and updates the associated load profile. The energy management system 108 uses the updated load profile to self-program accordingly to prevent overloading of the microinverters 114 in a future iteration, maintaining system integrity and preventing the microgrid 100 from switching off. In some examples, the trained ML model performs a gap analysis for a predetermined duration of time, such as six hours, twelve hours, or twenty-four hours. In other examples, the trained ML optimizes the load management of the microgrid 100 based on an extended window of time, such as one week, two weeks, or one month, or makes seasonal adjustments, such as optimizing the load differently in the summer than in the winter. Based on the results of learning performed in the learning mode, recommendations may be presented to a user, such as via the application presented on the user interface, for load changes at an interval. The interval may be predetermined or selected by a user, and may be every week, every two weeks, every month, seasonal, and so forth. For example, a recommendation to accept or reject new load profiles can be generated every two weeks based on a two-week load learning period. In another example, a recommendation to accept or reject new load profiles can be generated each month based on a one-month load learning period. In yet another example, a recommendation to accept or reject new load profiles that are recommended as a new season (e.g., fall, winter, spring, or summer) approaches based on a year-long load learning period. Even though trained ML models are described here for load profile learning, other non-ML based methods can be used as well, for example statistical methods.

In the execution mode, the energy management system 108 executes one or more load shed processes to control which electrical loads are loading the microinverters 114. Thus, by learning a load profile and then adding/shedding a load based on the learned load profile, the energy management system 108 is not limited to a prewired arrangement that may otherwise require rewiring by a skilled professional, such as a licensed electrician, when a new load is added to or removed from the electrical system.

As noted above, the energy management system 108 can perform load shedding. In some examples, the energy management system 108 sheds loads based on priority. The priority of a load may be determined based on the average power available in the microgrid 100 and/or a customer requirement. In some examples, where temperature thresholds of certain relays 122 in the energy management system 108 coupled with microinverters 114 are crossed, load shedding may be performed in quartiles or according to another schema. energy management system 108 is further operable to perform load adding or reconnecting in certain conditions, such as where the temperature of a relay 122 has receded back away from the temperature threshold. Thus, the energy management system 108 can prevent pitting (e.g., physical deterioration) in relays and increase the safety of the system.

In some examples, the energy management system 108 is connected to multiple circuits. In one example, the energy management system 108 is connected to up to 14 circuits. Multiple energy management systems 108 can be connected in parallel to manage a microgrid 100 of any suitable size. For example, a microgrid including 14 energy management systems can have up to 210 circuits.

In some examples, if an interruption of the utility power supply occurs, the microinverters 114 can automatically supply electrical power to a plurality of electrical loads based on the determined priority. If a loading on the microinverters 114 exceeds a preset loading value, the energy management system 108 can electrically isolate the plurality of electrical loads and then individually reconnect the plurality of controllable electrical loads to the microgrid 100 based on an order of preference, as determined from the prioritization of the plurality of electrical loads. The plurality of loads are reconnected in the order of preference, for example until the loading by the electrical loads reaches the pre-set loading value.

In some examples where microinverters 114 are overloaded and shut down, the microgrid 100 can restart and the energy management system 108 can analyze why the system was overloaded (e.g., determine which load caused the electrical system to shut down). The energy management system 108 can then self-program accordingly to avoid further overloading and shutdowns of the microgrid 100. For example, the energy management system 108 can learn a new power threshold and create a new associated load-shedding profile to prevent recurrence.

In some examples, the load management is performed based at least in part on inputs received from a user or a customer. For example, load management can be performed based on manual intervention where the user or the customer can manually set the load priorities, via the user interface of the application, as per requirements. The load management can then be carried out according to the manual preferences. This may be an additional option provided by the system in case the user chooses not to rely on the automated process of self-learning. In some examples, the energy management system 108 compares peak power and continuous running power to learned values to look for irregularly high energy consumption that could indicate a failure and then provides a user warning.

Figure 1B:
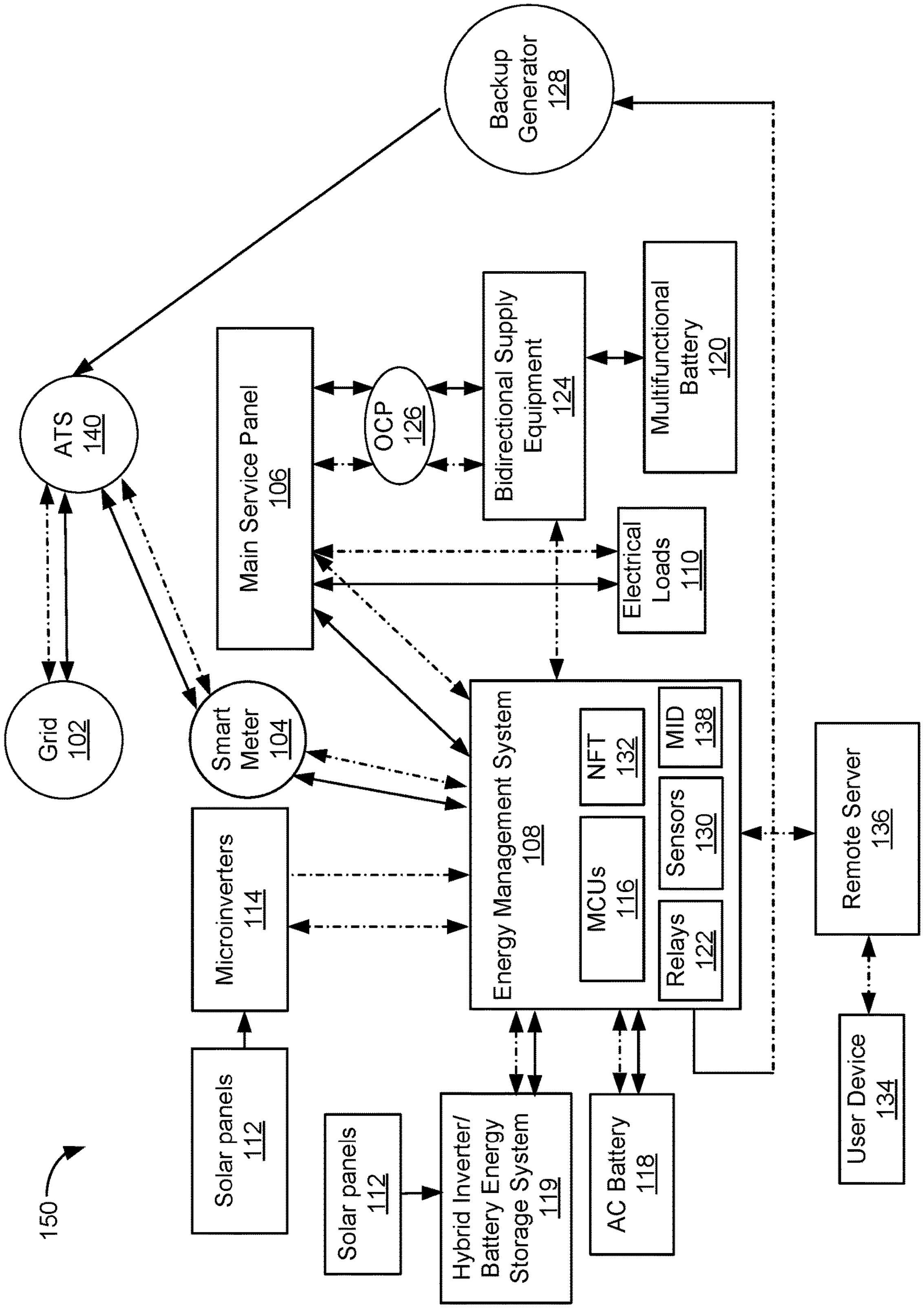
FIG. 1B illustrates a block diagram of an example of an energy management system in an alternative microgrid according to some aspects of the present disclosure.

FIG. 1B illustrates a block diagram of an example of an energy management system 108 in an alternative microgrid 150 according to some aspects of the present disclosure. The alternative microgrid 150 illustrated in FIG. 1B shares common elements with the microgrid 100 illustrated in FIG. 1A and the description provided in relation to FIG. 1A is applicable to FIG. 1B as appropriate. In FIG. 1B, a utility grid 102 and the smart meter 104 are coupled to the energy management system 108 rather than the main service panel 106.

Figure 1C:
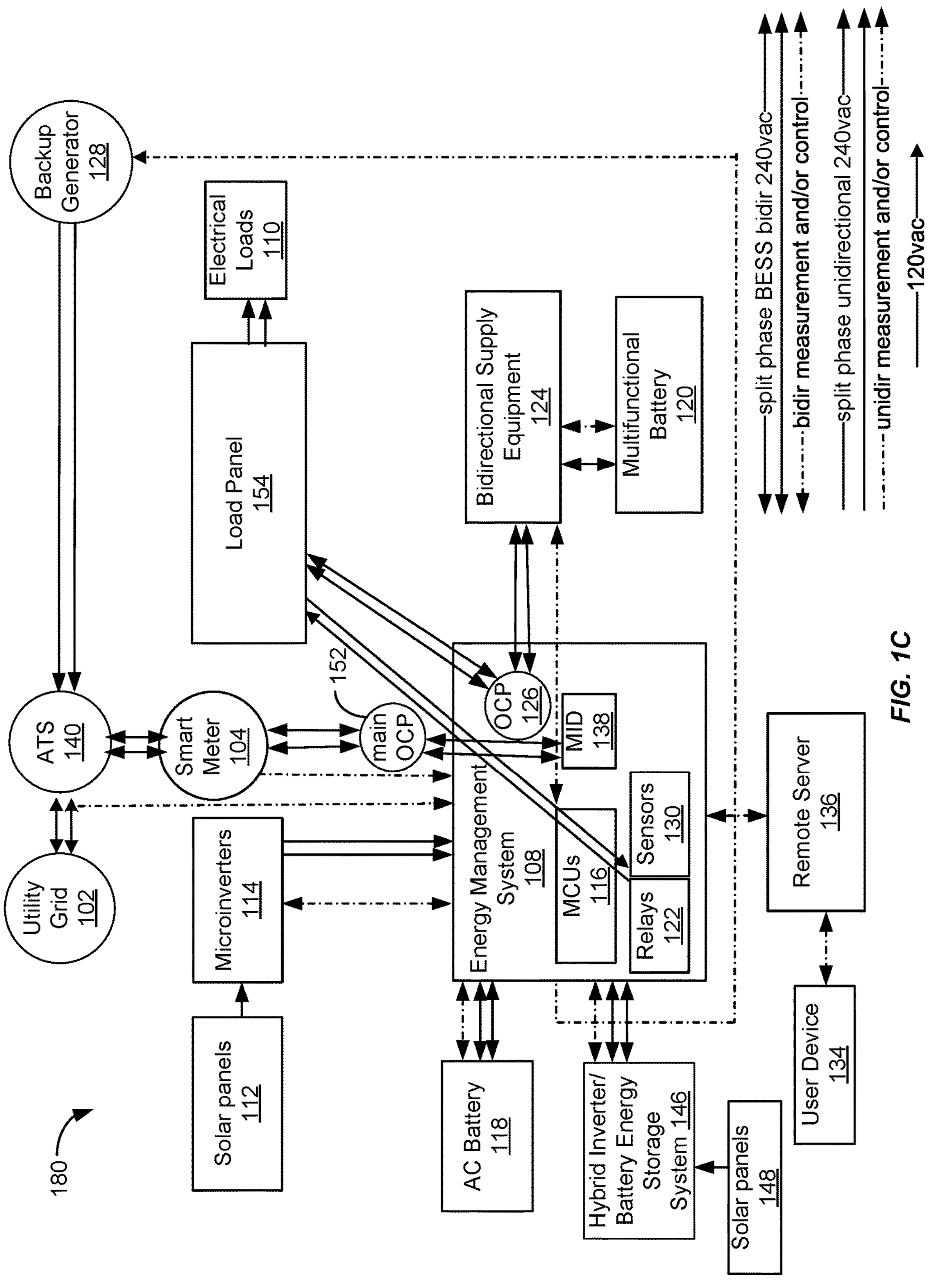
FIG. 1C illustrates a block diagram of an example of an energy management system in an alternative microgrid according to some aspects of the present disclosure.

FIG. 1C illustrates a block diagram of an example of an energy management system 108 in an alternative microgrid 180 according to some aspects of the present disclosure. The alternative microgrid 180 illustrated in FIG. 1C shares common elements with the microgrid 100 illustrated in FIG. 1A and the description provided in relation to FIG. 1A is applicable to FIG. 1B as appropriate. In FIG. 1C, the backup generator 128 is connected to an ATS 140. The utility grid 102 is also connected to the ATS 140. ATS 140 is connected to the smart meter 104 and the main OCP 152, before connecting to the MID 138 in the energy management system 108. The electrical loads 110 are connected to a load panel 154, which are then connected to relays 122 of the energy management system 108. The breaker panel can include a main load panel and/or a critical load panel, with a main breaker and one or more branch breakers. The bidirectional supply equipment 124 coupled with the multifunctional battery 120 is connected to an OCP 126, which is part of the energy management system 108. The hybrid inverter/battery energy storage system 146 is connected with one or more solar panels 148.

Figure 2:
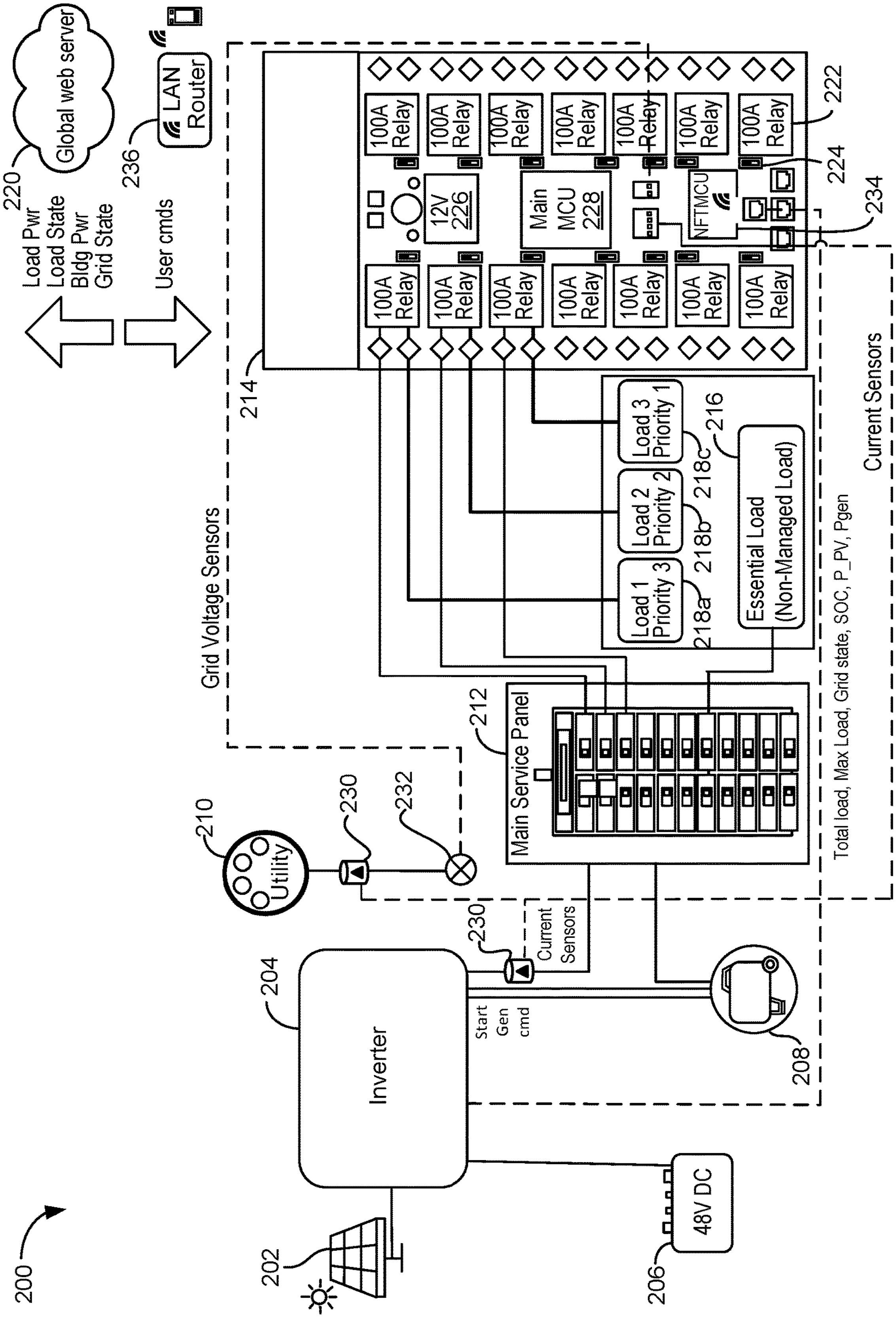
FIG. 2 illustrates an example configuration of a microgrid with an energy management system integrated according to some aspects of the present disclosure.

FIG. 2 illustrates a microgrid 200 including solar panels connected with an inverter according to an example. As illustrated in FIG. 2, the microgrid 200 includes one or more solar panels 202, a battery energy storage system 206, a backup generator 208, and an energy management system 214 a main service panel 212. The backup generator 208 can be connected to the inverter 204 as illustrated in FIG. 2, the main service panel 212, or a backup service panel. The solar panels 202 and the battery energy storage system 206 can be connected to the main service panel 212 via an inverter 204. The inverter 204 can be a proprietary inverter, which can transmit data associated with the solar panels 202, the battery energy storage system 206, or the inverter 204 to the energy management system 214. Some examples of the data transmitted by the inverter 204 include solar panel MPP, battery state of charge, battery capacity, battery state of health. The inverter 204 can also be a third-party inverter, where only voltage and current data can be measured and obtained by the energy management system 214. The energy management system 214 can also receive data related to generator capacity and grid capacity. The energy management system 214 can also monitor, manage, and report loads. The main service panel can also connect to the utility grid 210. The main service panel 212 can connect to the different load circuits via breakers to provide power from the energy sources to the loads in the microgrid 200. For example, some non-manageable loads 216 can be connected to the main service panel 212. The energy management system 214 can connect with and controls one or more manageable loads, for example Load 1 218*a*, Load 2 218*b*, and Load 3 218*c*, via relays. The one or more manageable loads can have different priorities. For example, Load 1 218*a* has a priority of 3, Load 2 218*b* has a priority of 2, and Load 3 has a priority of 1, which means Load 3 218*c* can be prioritized as the first one to be powered up, Load 2 218*b* can be prioritized as the second one to be powered up, and Load 1 218*a* can be prioritized as third one to power up, among the one or more manageable loads in the microgrid 200. In some examples, the energy management system 214 can connect to an alternate current (AC) generator or one or more solar panels at a generator port for smart control. The energy management system 214 may communicate with a server 220, such as a web server or a cloud server. The energy management system 214 may communicate with the server 220 via a network, which can be accessed through a local area network (LAN) router 236 or through other Wi-Fi internet access routes including cellular towers or satellite internet. The energy management system 214 can be configured in a panel including a plurality of relay switches 222 each coupled with a current sensor 224, a 12 V regulator 226, a main MCU 228, and an NFT MCU 234. In addition, current sensor 230 can be installed at the utility grid 210 for measuring the overall grid current. Current sensors 230 can measure inverter output current to the loads in the microgrid 200. Grid voltage sensors 232 can be installed for monitoring grid voltage The inverter 204 can transmit different types of measurements to the energy management system 214, for example total load, maximum load, grid state, battery state of charge (SoC), power at the solar panels 202, and power at the backup generator 208, via Modbus TCP/IP Ethernet or WiFi or RTU RS-485 communication protocols.

Figure 3A:
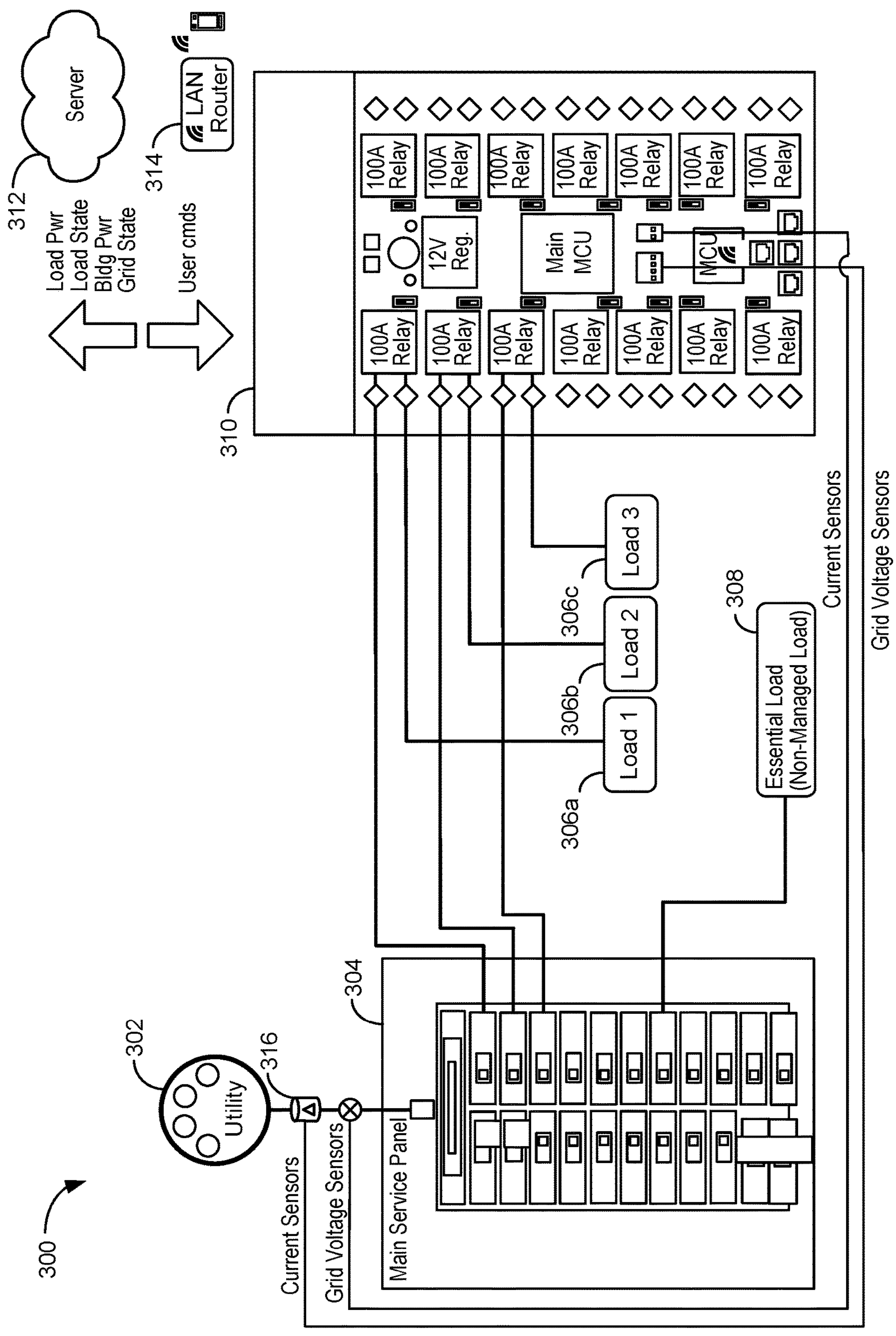
FIG. 3A illustrates another example configuration of an energy management system according to some aspects of the present disclosure.

FIG. 3A illustrates a microgrid 300 without solar panels according to an example. As illustrated in FIG. 3A, the microgrid 300 does not include solar panels and or an electrical inverter, but connects to the utility grid 302 via the main service panel 304. The energy management system 310 is connected to a main service panel 304 and certain manageable loads, such as Load 1 306*a*, Load 2 306*b*, and Load 3 306*c*. Non-managed loads 308 are connected to the main service panel 304. The energy management system 310 communicates with a server 312, such as a web server or a cloud server, by a network. The network may be accessed via a LAN router 314 or another network device. The energy management system 310 is configured similarly to the energy management system 214 as shown in FIG. 2. Since there is no other power source in the microgrid 300 except the utility grid 302, the energy management system 310 can manage the manageable loads illustrated by Load 1 306*a*, Load 2 306*b*, and Load 3, 306*c* based on grid request messages, such as demand response or peak-shaving commands. One or more current sensors 316 can be implemented to measure the supply current in each phase at the utility grid connection point. There can be one, two, or three current sensors 316, depending on the number of phases of the utility grid supplying the microgrid 300.

Figure 3B:
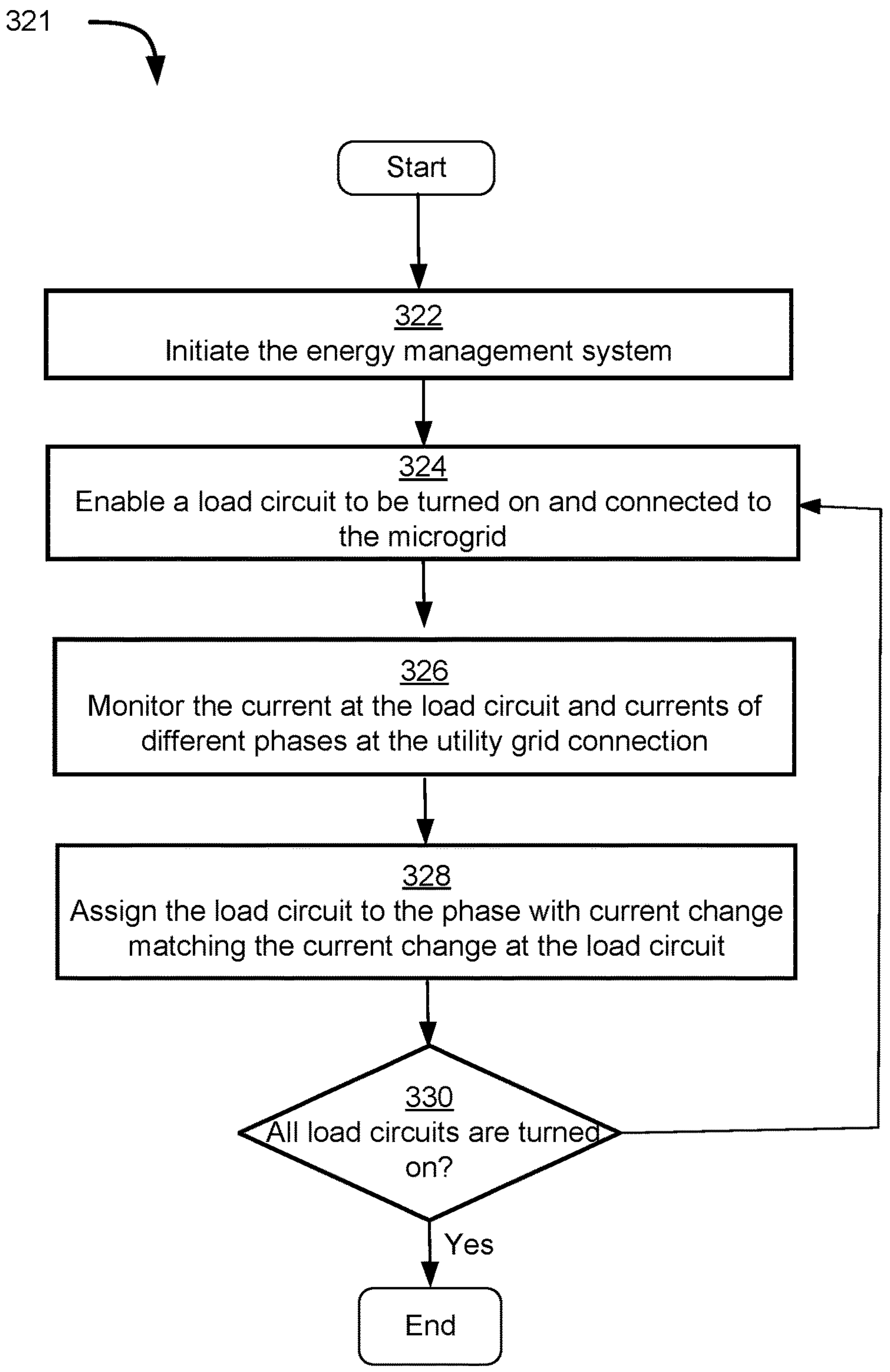
FIG. 3B illustrates a flowchart of an example of a process performed by an energy management system for determining a phase that each load circuit is connected to at the beginning of powering up the load circuits in a microgrid according to some aspects of the present disclosure.

FIG. 3B illustrates a flowchart of an example of a process 321 performed by an energy management system for determining a phase that each load circuit is connected to at the beginning of turning on the load circuits in a microgrid as illustrated in FIG. 3A according to some aspects of the present disclosure. Prior to turning on the load circuits in the microgrid 300, the energy management system 310 is initiated at step 322. At step 324, the energy management system 310 enables a load circuit to be turned on and connected to the microgrid 300 one at a time. For example, Load 1 306*a*, Load 2 306*b*, Load 3 306*c*, in FIG. 3 are connected to the energy management system 310 but are not turned on at the beginning, and the energy management system 310 can enable one load to be turned on at a time.

At step 326, the energy management system 310 monitors the current at the load circuit and currents of different phases at the utility grid. The current at the load circuit can be obtained via a current sensor coupled with a relay switch in the energy management system 310 that is connected to the load circuit. The current sensors 316 at the utility grid connection can monitor the currents of different phases. There can be three current sensors to measure the current in each phase. At step 328, the energy management system 310 assigns the load circuit to the phase with the current change matching the current change at the load circuit. For example, when Load 1 306*a* is turned on, the current change at a current sensor measuring phase A current at the utility grid connection changed, and the load circuit is assigned to phase A. At step 330, the energy management system 310 determines if all the load circuits are turned on. If all the load circuits are turned on, the process 321 ends. If not all the load circuits are turned on, the process 321 proceeds to step 324 to turn on another load circuit in order to identify the phase the load circuit is connected to, until all the load circuits are turned on.

Figure 3C:
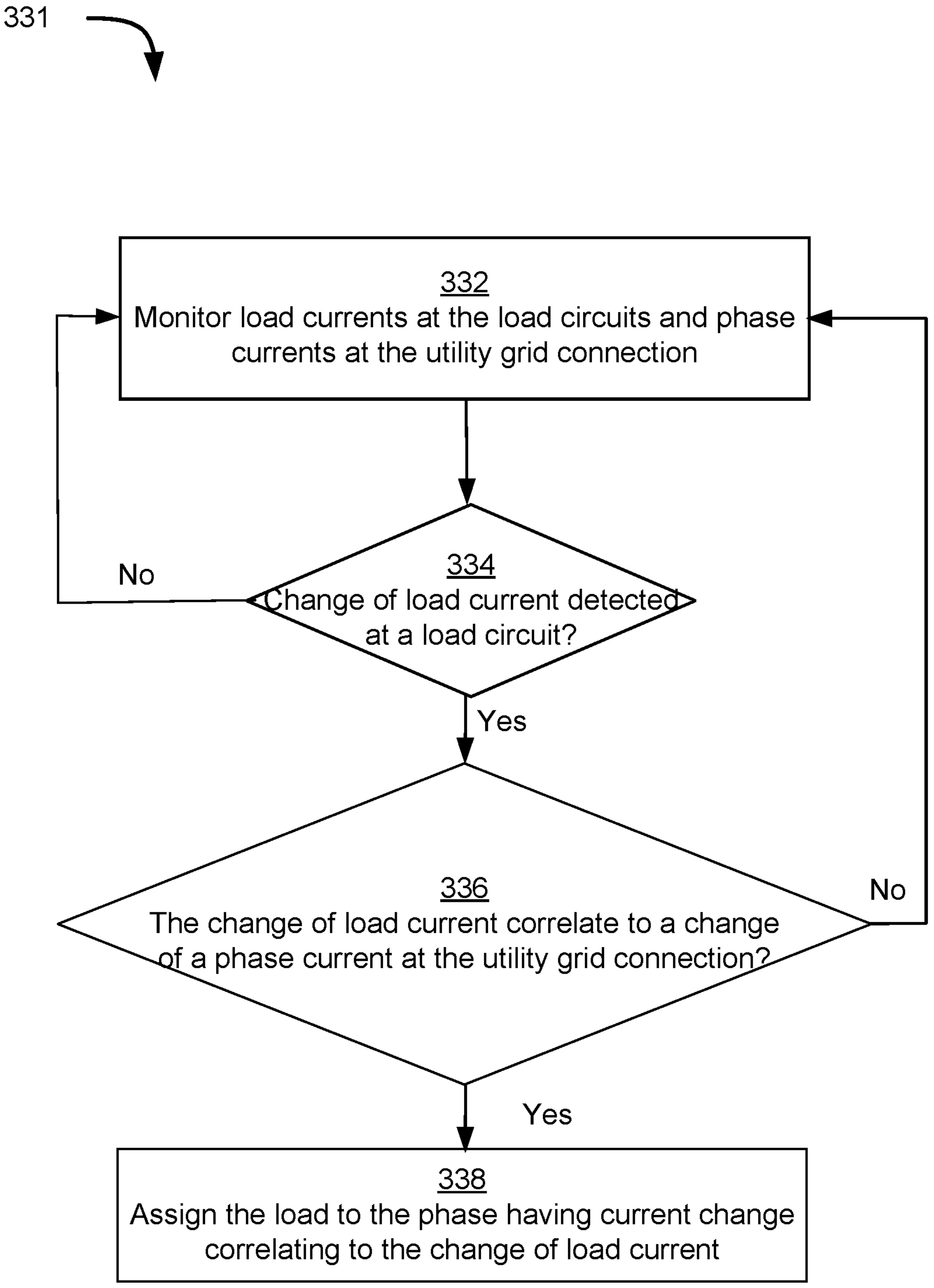
FIG. 3C illustrates a flowchart of an example of a process performed by an energy management system for determining a phase that a load circuit is connected to when the load circuit is already turned on according to some aspects of the present disclosure.

FIG. 3C illustrates a flowchart of an example of a process 331 performed by an energy management system 310 for determining a phase that a load circuit is connected to when the load circuit is already turned on as illustrated in FIG. 3A according to some aspects of the present disclosure. At step 332, the energy management system 310 monitors load currents at the load circuits and phase currents at the utility grid connection. Each load circuit is connected to a relay switch in the energy management system 310 in FIG. 3A, and each relay switch is coupled with a current sensor.

The current sensor can measure the load current in the corresponding load circuit. The current sensors 316 measure phase currents at the utility grid connection. At step 334, the energy management system 310 determines if a change of load current is detected at a load. The change of load current can be caused by manual intervention, such as turning the air conditioner to a higher temperature or a lower temperature. The load current and phase currents can be monitored over a period of time so that a change can be detected. The load current can be an average current value. If a change of load current is detected at the load circuit, the process 331 proceeds to step 336. At step 336, the energy management system 310 determines if the change of load current at the load circuit correlates to a change of a phase current at the utility grid connection. If the change of load current at the load circuit correlates to a change of a phase current at the utility grid connection, for example, the phase current changes at the same time the load current changes over a period of time, the process 331 proceeds to step 338. At step 338, the energy management system 310 assigns the load circuit to the phase having a current change correlating to the change of load current. If the change of load current at the load circuit does not correlate to a change of a phase current at the utility grid connection, the process 331 proceeds to step 332 to continue monitoring the load currents and the phase currents.

Figure 3D:
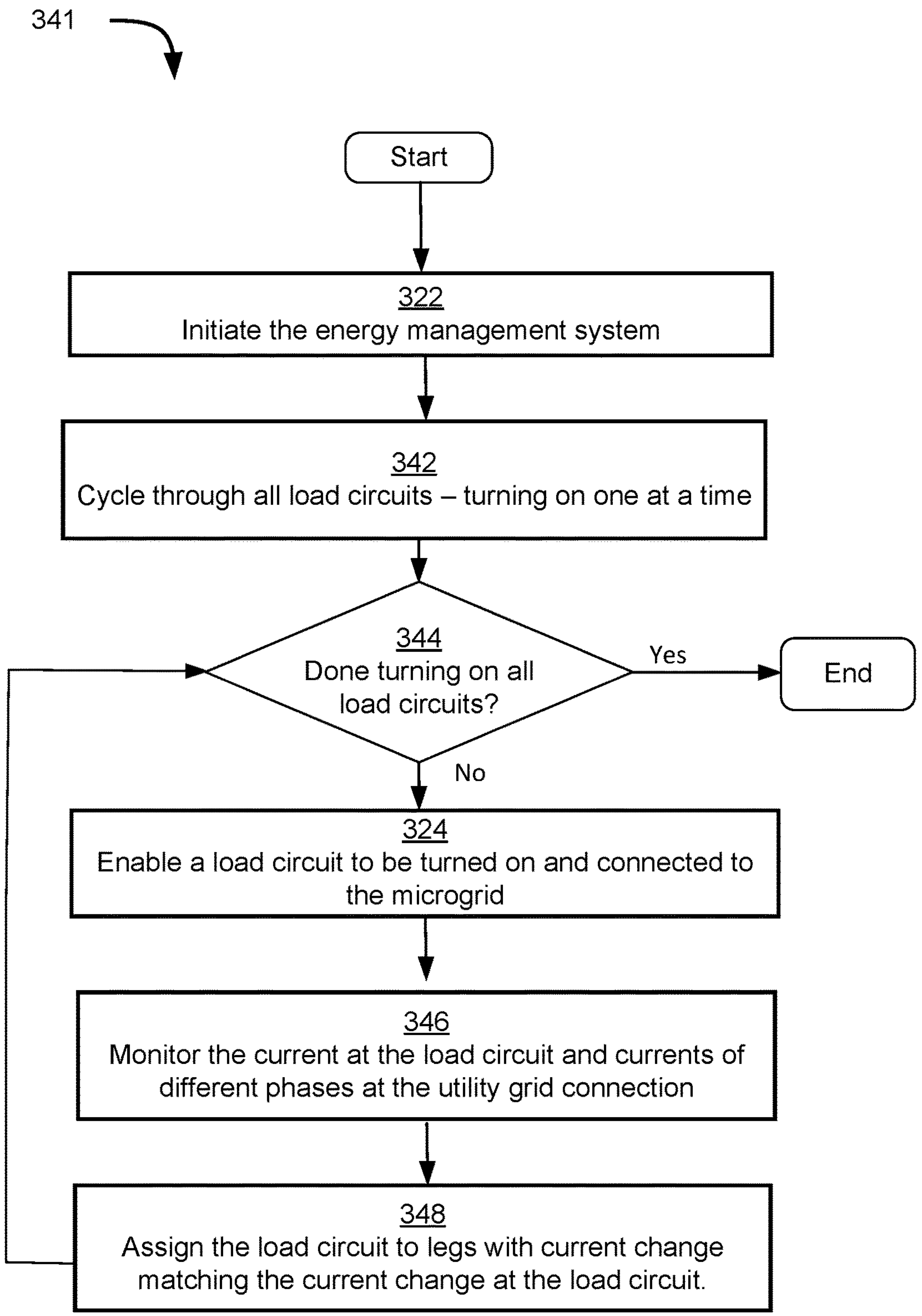
FIG. 3D illustrates a flowchart of an example of an alternative process performed by an energy management system for determining a leg that each load circuit is connected to at the beginning of turning on the load circuits in a microgrid as illustrated in FIG. 3A according to some aspects of the present disclosure.

FIG. 3D illustrates a flowchart of an example of an alternative process 341 performed by an energy management system for determining a leg that each load circuit is connected to at the beginning of turning on the load circuits in a microgrid as illustrated in FIG. 3A according to some aspects of the present disclosure. The alternative process 341 illustrated in FIG. 3D shares common steps with the process 321 illustrated in FIG. 3B and the description provided in relation to FIG. 3B is applicable to FIG. 3D as appropriate. In FIG. 1C, after initiating the energy management system at step 322, the energy management system cycles through all load circuits by turning on one at a time at step 342. At step 344, the energy management system determines if the energy management system is done turning on all load circuits. If yes, the alternative process 341 ends. If no, the alternative process 341 proceeds to enable a load circuit to be turned on and connected to the microgrid at step 324. At step 346, the energy management system monitors the current at the load circuit and currents of different legs at the utility grid connection. Each leg corresponds to a phase in a three-phase utility grid. At step 348, the energy management system assigns the load circuit to legs with current change matching the current change at the load circuit.

Figure 3E:
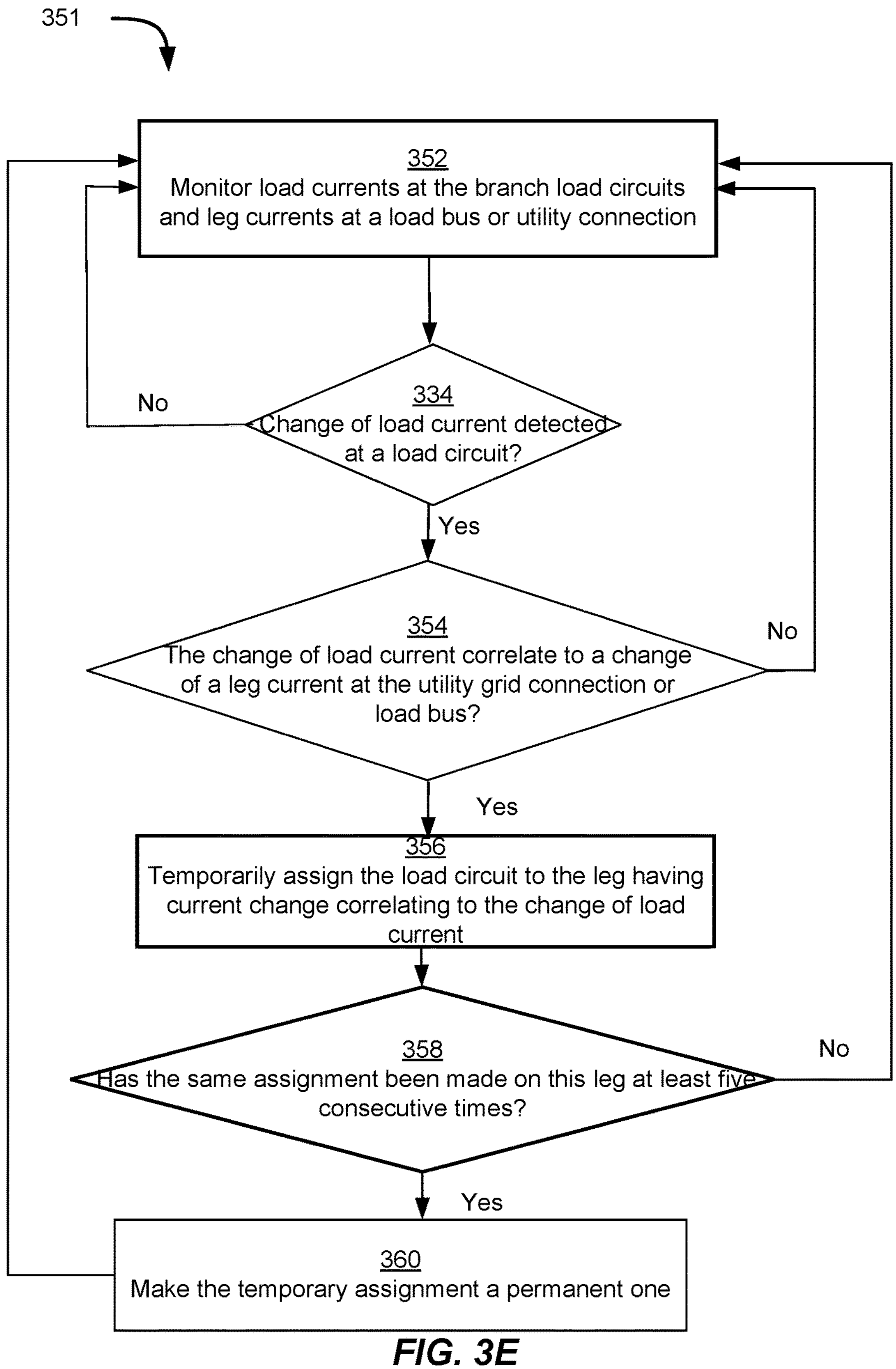
FIG. 3E illustrates a flowchart of an example of an alternative process performed by an energy management system for determining a leg that a load circuit is connected to when the load circuit is already turned on as illustrated in FIG. 3A according to some aspects of the present disclosure.

FIG. 3E illustrates a flowchart of an example of an alternative process 351 performed by an energy management system 310 for determining a leg that a load circuit is connected to when the load circuit is already turned on as illustrated in FIG. 3A according to some aspects of the present disclosure. At step 352, the energy management system monitors load currents at load circuits and leg currents at a load bus or utility grid connection. At step 334, the energy management system determines if change of load current is detected at a load circuit. If no change in any load current is detected, the alternative process 351 proceeds back to step 352. If a change of load current is detected, the alternative process 351 proceeds to step 354. At step 354, the energy management system determines if the change of load current correlates to a change of a leg current at the utility grid connection or the load bus. If no correlation is determined, the alternative process 351 proceeds back to step 352. If correlation is determined, the energy management system temporarily assigns the load circuit to the leg having current change correlating to the change of the load current at step 356. At step 358, the energy management system determines if the same assignment has been made on the leg at least five consecutive times. If no, the alternative process 351 proceeds back to step 352. If yes, the energy management system makes the temporary assignment a permanent one at step 360.

The phase identification in FIG. 3B and FIG. 3C or the leg assignment in FIGS. 3D and 3E are described based on the configuration of the microgrid in FIG. 3A. However, there can be different microgrid configurations. The processes in FIGS. 3B-3E can be modified accordingly, which will be evident to a person of ordinary skill in the art. For example, the microgrid in FIGS. 3B-3E is a two-phase system (with two legs), and the loads in the two phases (or two legs) need to be balanced. If a load is a single-phase load, the load is assigned to one phase (or leg). If a load is a two-phase load, the load is assigned to two phases (or legs). In some examples, the microgrid is a three-phase system, processes in FIGS. 3B-3E are applicable to determine which one, two, or three phases (or legs) a load is connected.

Figure 4:
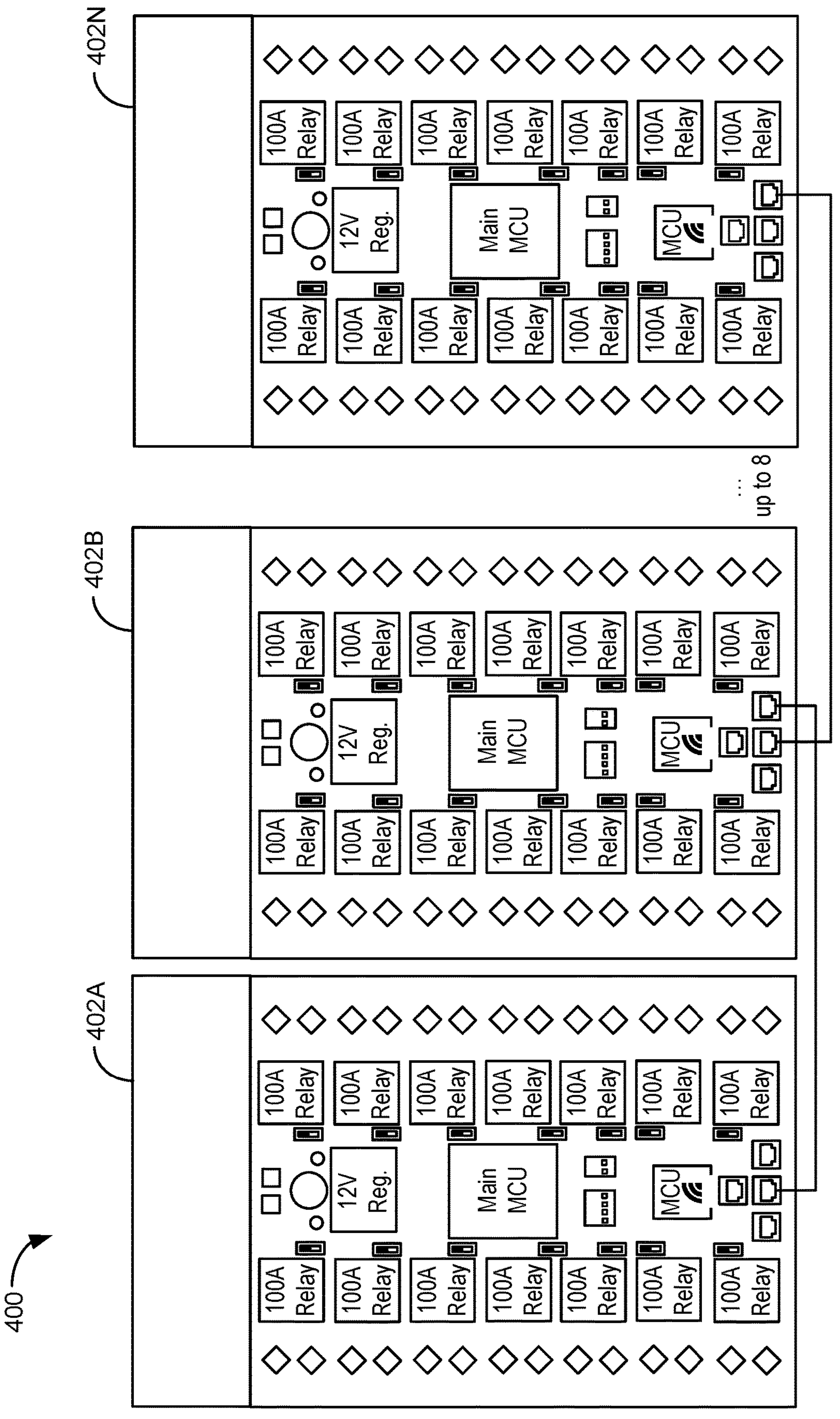
FIG. 4 illustrates an example of a system including a plurality of energy management systems according to some aspects of the present disclosure.

FIG. 4 illustrates a system 400 including a plurality of energy management systems according to an example. In FIG. 4, energy management systems 402A, 402B, and 402N are illustrated, but it would be appreciated that additional energy management systems can be utilized. Merely by way of example, the system illustrated in FIG. 4 can include up to 8 parallel energy management systems, each of which can manage up to 14 load circuits. However, these particular numbers are not limiting, and other numbers of energy management systems and other numbers of load circuits can be utilized. One of ordinary skill in the art would recognize many variations, modifications, and alternatives. Thus, the system of FIG. 4 can manage up to 112 load circuits. However, the total number of energy management systems that can be used in an energy system can vary. The plurality of energy management systems may be individually configured the same as the energy management system 214 in FIG. 2 or the energy management system 310 in FIG. 3A. In this example, each energy management system is communicatively connected to one or more other energy management systems via IEEE 802.3 Ethernet. However, other communication protocols can be used, such as IEEE 802.11 Wi-Fi, RS-485, Controller Area Network, etc. One energy management system can be designated as a master energy management system to coordinate with other energy management systems. For example, energy management system 402A is designated as a master energy management system. energy management system 402A can be configured to communicate with other energy management systems for managing the loads and/or power sources in an energy system. Each energy management system can learn load profiles corresponding to loads connected to the respective energy management system and monitor power sources connected to the respective energy management system. The main MCU in the energy management system 402A can access all the load profiles and power source information. In some examples, the energy system using the plurality of energy management systems are divided into a plurality of regions, and the plurality of regions can connect or disconnect from each other. Each energy management system manages the loads and power sources in the respective region.

Figure 5:
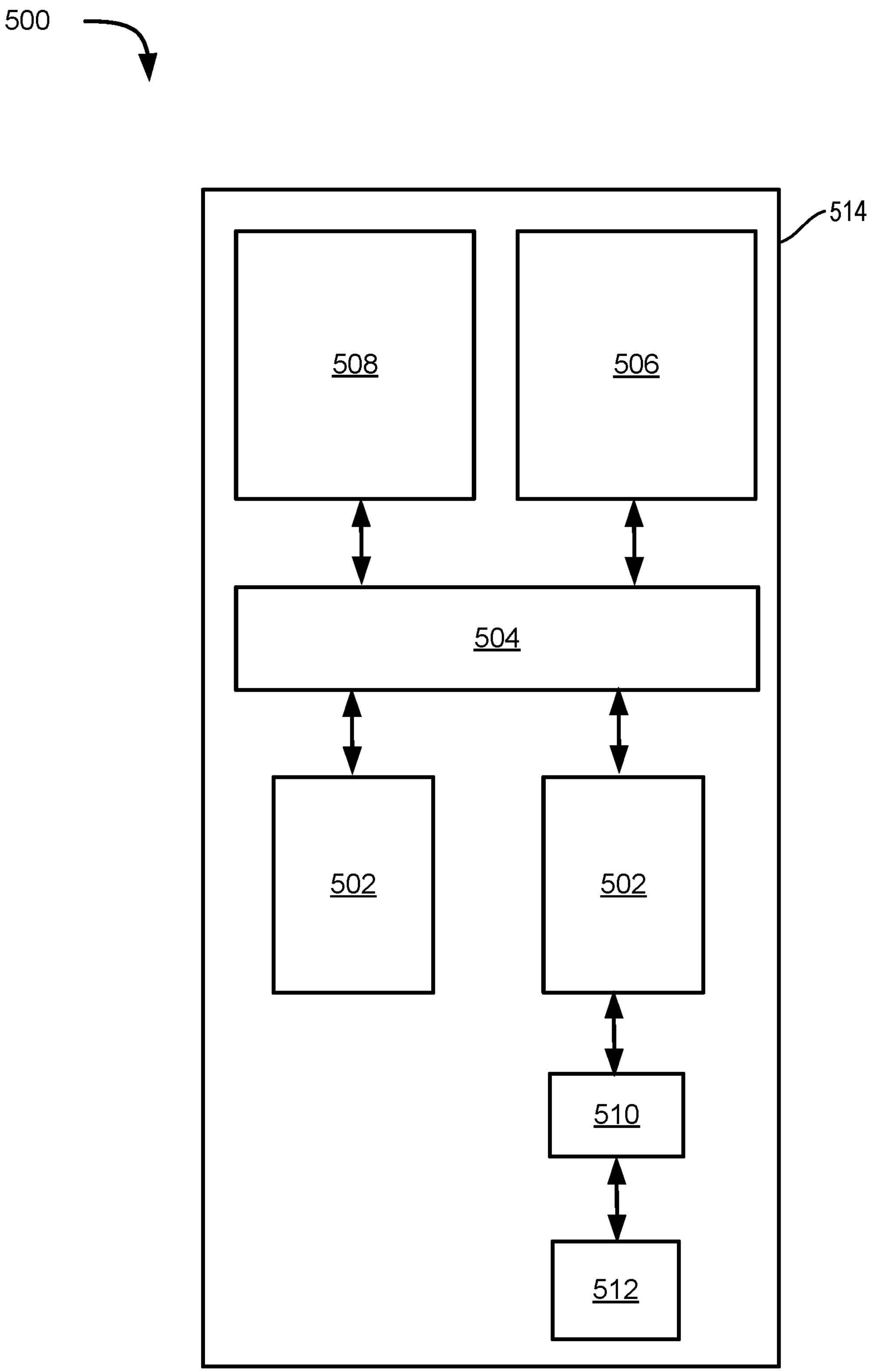
FIG. 5 illustrates an example configuration of an energy management system according to some aspects of the present disclosure.

FIG. 5 illustrates an example configuration of an energy management system 500 according to some aspects of the present disclosure. The energy management system 500 includes two relay boards 502, a control board 504, a battery 506 configured to power the control board 504, an NFT 508, a microgrid interconnection device (MID) board 510, and a circuit breaker 512. In addition, the energy management system 500 can include a board for mounting a visual human machine interface for displaying status and diagnostic information. In FIG. 5, each relay board 502 includes 4 relay switches coupled with 4 current sensors respectively. However, a relay board 502 can include different numbers of relay switches. The control board 504 can include one or more MCUs (not shown), for example a main MCU and a network MCU for engaging in network communications. All of the components of the energy management system 500 can be manufactured as a panel and enclosed in an enclosure 514. The thickness of the enclosure can be based on the dimensions of the enclosure in compliance with certain electrical design standards. For example, if the dimensions of the enclosure 514 is 20.5 inches in width by 40.5 inches in length by 6 inches in depth, the minimum thickness of the enclosure material is about 2.41 millimeters (0.095 inches). The energy management system 500 can be connected to a main service panel at a home or building. Multiple power sources, for example solar panels and batteries, and loads can be connected to the relays on the relay boards 502 of the energy management system 500. The MID board 510 may include an automatic transfer switch configured to automatically transfer a power supply of a microgrid from its primary source (e.g., the utility grid) to a backup source when the microgrid senses a failure or outage in the primary source so that the microgrid can operate as a standalone system. The circuit breaker 512 can be optionally connected between the MID board 510 and the primary source (e.g., the utility grid).

The enclosure 514 of the energy management system 500 can be made of any suitable metal material, such as aluminum. The metal material can be selected to allow the enclosure to serve as a thermal sink for the relay boards 502 and the MID board 510. The relay boards 502 can be bound to the enclosure 514 through thermal pads. The sizes of the thermal pads can match the sizes of the relay boards 502 and the MID board 510. For example, a thermal pad for a relay board 502 has the same size and dimensions (e.g., length and width) as those of the relay board 502. The relay boards 502 and the MID board 510 can get much hotter than the circuits on the control board 504. To protect the control board 504 and improve its longevity, the control board 504 can be thermally insulated from the relay boards 502, the MID board 510, and other parts of the energy management system 500. For example, the control board 504 can be mounted on a metal L bracket, vertical to and separated from the relay boards 502 and the MID board 510. The distance from the control board 504 to the relay boards 502 can be about 12.7 millimeters. This configuration can not only reduce thermal heat on the control board 504, but also save space, minimize electromagnetic interference (EMI), and make it easy to install the relay boards 502.

Each relay board can be manufactured as an interchangeable module that includes a fixed set of relay switches, for example 4 or 8. When one relay switch fails, the entire relay board can be replaced. The relay boards 502 allow 180-degree rotation to be installed on the left or right side of the AC bus in the middle of the enclosure of the energy management system 500.

Current sensors can be paired with relay switches on a relay board to measure currents in the load circuits or from certain energy sources connected to corresponding relay switches. Some current sensors can be more accurate in higher temperatures. If the ambient temperature is lower than 25° C., especially in cold regions, the current sensors may not operate accurately. Above 25° C., the higher the ambient temperature is, the higher the accuracy level may be. However, if the ambient temperature is too high, it may damage the current sensor. Therefore, the current sensors can be placed on a relay board closer to the relays and heated by the heat generated at the relays, especially in cold regions (e.g., Alaska), but not too close to damage the current sensor. Thermal analysis techniques can be used to determine the optimal placement for the current sensors to improve sensing accuracy without damaging them. For example, a reference current can be calculated by using Ohm's law when applying a precision calibrated 120 VAC testing voltage source to a testing resistive load with known accuracy. Precise AC currents can be measured by a current sensor when the current sensor is at the nearest distance to a relay switch and when the relay is at its highest temperature. The nearest distance can be obtained from certain safety design requirements (e.g., Underwriters Laboratories (UL) creepage and clearance minimization requirements). A radial temperature model can be built starting from the location at the nearest distance to the relay switch to determine temperatures at different distances from the relay. Testing currents can be measured and compared to the reference current for precision at different distances from the relay with corresponding temperatures obtained from the radial temperature model. An optimal location for the current sensor can be obtained with the most precise current measurement.

In some examples, the energy management system 500 can include a battery 506 within its enclosure that can power various components, such as the MCUs on the control board. The battery 506 can be automatically tested by the energy management system 500 periodically (e.g., quarterly) to determine whether it needs to be replaced or has degraded. During the test, the energy management system 500 can slowly drain the battery 506 to verify its capacity. If the battery's 506 drain rate is different than an expected drain rate, which can be predefined or dynamically determined from the results of prior battery tests, it may mean that the battery 506 has degraded. So, the energy management system 500 can alert the user to notify the user of the problem and that the battery 506 should be replaced. The electronics or software needed for the testing can be integrated on the control board 504 of the energy management system 500. In some examples, battery testing can be automatically initiated by the control microprocessor when there is an AC outage of some or all available AC sources in the microgrid. A control microprocessor, which can be installed on the control board 504, can be programmed to command the battery 506 to discharge to one or more auxiliary loads connected to the main service panel in a microgrid as a self-test cycle. After a battery rest time, the control microprocessor can start a recharge cycle to restore the battery state to a charge percentage. It may be desirable for the discharge interval to remain within 2 standard deviations of the average discharge intervals. The average discharge interval can be the time to fully discharge the battery with a fixed test load over several iterations. The discharge interval can be monitored by the control microprocessor, and if the discharge interval is reduced by a significant percentage (e.g., 10%), it can indicate that the battery's state of health is significantly reduced. In this case, the control microprocessor can transmit an alert to the user.

Figure 6:
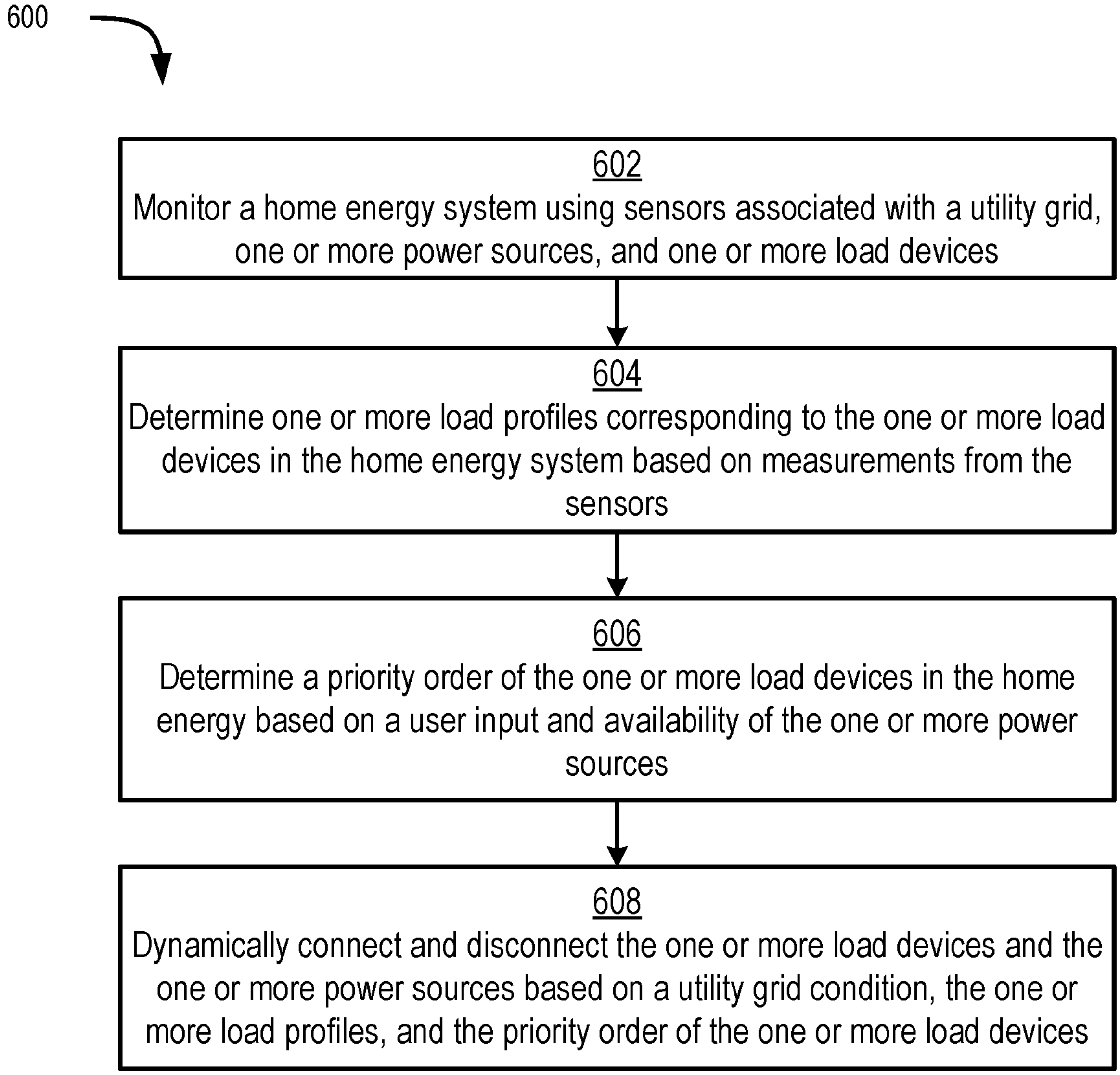
FIG. 6 is a flowchart of an example of a process performed by an energy management system for managing the loads and power sources in a microgrid according to some aspects of the present disclosure.

FIG. 6 is a flowchart of an example of a process 600 performed by an energy management system for managing the loads and power sources in a microgrid according to some aspects of the present disclosure. At step 602, an energy management system monitors a microgrid using sensors associated with a utility grid, one or more power sources, and one or more load devices. The energy management system can be an energy management system as described in FIGS. 1-5, including one or more microcontroller units, a microgrid interconnection device configured to connect with or disconnect from the utility grid, and one or more relay switches configured to connect with one or more power sources and one or more load devices in a microgrid accordingly. In some examples, the one or more power sources include a set of solar panels connected to the energy management system via one or more microinverters. The energy management system can determine an available power from the set of solar panels by communicating with the one or more microinverters. In some examples, the one or more power sources includes one or more multifunctional batteries connected with the energy management system via bidirectional supply equipment. The one or more multifunctional batteries can be coupled to one or more inverters. The energy management system can charge at least one of the one or more multifunctional batteries in response to determining that the available power from the set of solar panels is more than a total load value of the one or more load devices in the microgrid. Alternatively, the energy management system can discharge at least one of the one or more multifunctional batteries to supply to the one or more load devices in the microgrid in response to determining that the available power from the set of solar panels is less than the total load value of the one or more load devices in the microgrid.

At step 604, the energy management system determines one or more load profiles corresponding to the one or more load devices in the microgrid based on measurements from the sensors. In some examples, the energy management system can determine multiple power consumption parameters associated with a load device based on the current data collected during a predetermined time interval. The energy management system can then determine a load profile for the load device based on the multiple power consumption parameters. The multiple power consumption parameters can include an instantaneous power, an average power over a first time window, an average power over a second predefined time window that is smaller than the first time window, a maximum power over a third time window, and/or a peak power during a fourth time window starting from the load device being turned on. In some examples, the energy management system can determine a load profile corresponding to the load device in the microgrid based on an identification of a load circuit in the microgrid comprising the load device.

At step 606, the energy management system determines a priority order of the one or more load devices in the microgrid based on the one or more load profiles corresponding to the one or more load devices. In some examples, the priority order of the one or more load devices can be provided or updated by a user, for example via a user device connected to the energy management system via a remote server.

At step 608, the energy management system dynamically connects and disconnects the one or more load devices and the one or more power sources based on a utility grid condition, the one or more load profiles, and/or the priority order of the one or more load devices. This may involve a processor of the energy management system transmitting control signals to open and close the relays on the relay board. In some examples, the energy management system can connect an additional load device to the microgrid in response to determining that the total available power from the one or more power sources is greater than a total load value of the one or more load devices in the microgrid. In some examples, the energy management system can disconnect a load device from the microgrid based on the priority order of the one or more load devices, in response to determining that the total available power from the one or more power sources is less than a total load value of the one or more load devices in the microgrid.

Figure 7:
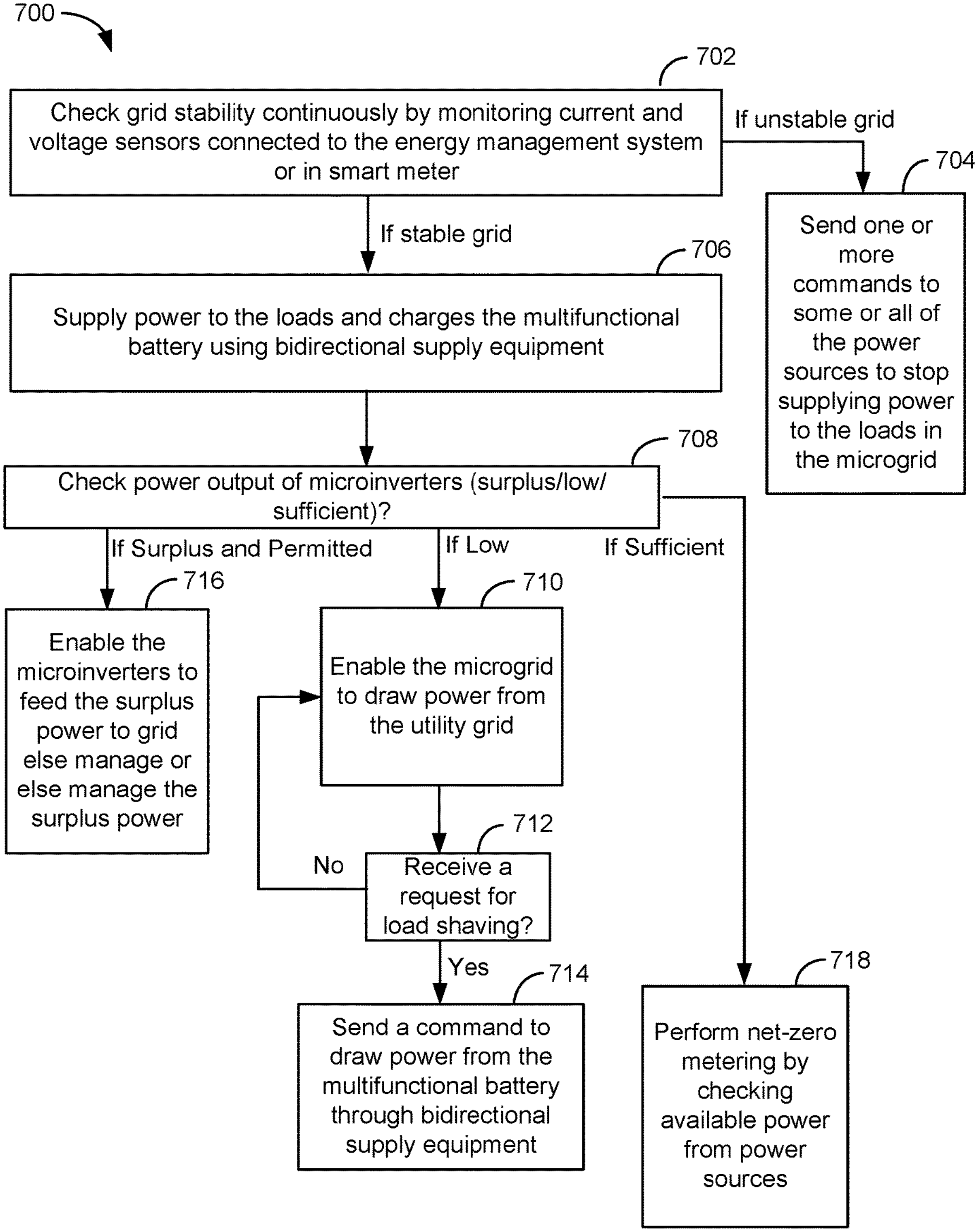
FIG. 7 is a flowchart of an example of a process performed by an energy management system for managing power sources in a microgrid during daytime according to some aspects of the present disclosure.
Figure 8:
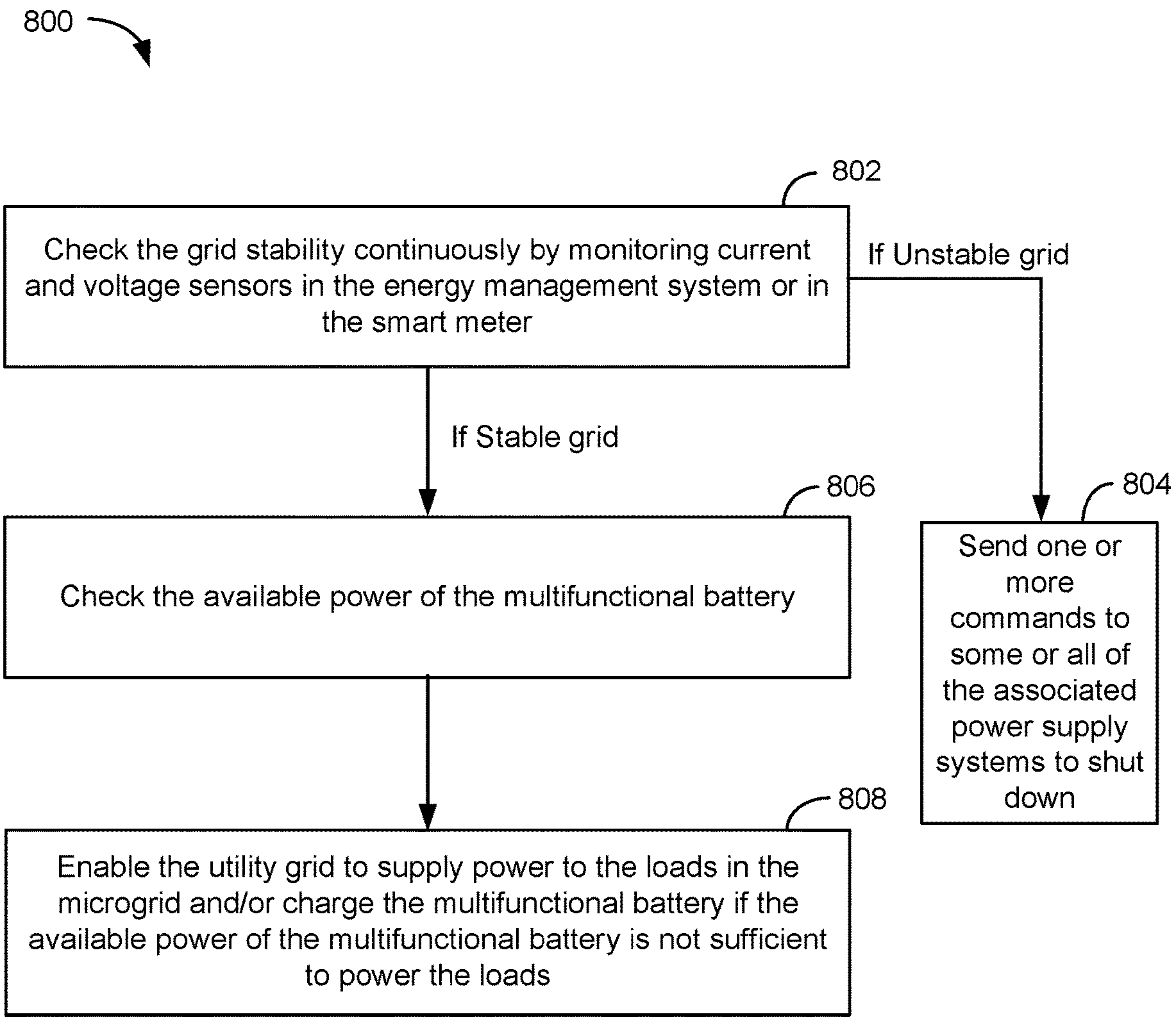
FIG. 8 is a flowchart of an example of a process performed by an energy management system for managing power sources in a microgrid during nighttime according to some aspects of the present disclosure.

FIG. 7 is a flow chart of an example of a process 700 performed by an energy management system for managing power sources in a microgrid during the daytime according to some aspects of the present disclosure. FIG. 8 is a flow chart of a process 800 performed by an energy management system for managing power sources in a microgrid during nighttime according to an example. In some examples, the flow charts illustrated in FIGS. 7-8 are performed by the energy management system illustrated in FIG. 1.

A grid tied microgrid in FIG. 7 can include a multifunctional battery with bidirectional supply equipment and solar panels with microinverters. During the daytime, the energy management system checks grid stability continuously by monitoring current and voltage sensors connected to the energy management system and/or in the smart meter (step 702). If the energy management system identifies that there is instability in the grid, the energy management system sends a command via a suitable communication channel to some or all of the power sources (e.g., the microinverters with solar panels, the multifunctional battery, etc.) to stop supplying power to the loads in the microgrid (step 704). Alternatively, at step 704, the energy management system can disconnect the microgrid from the utility grid via the MID, so that the microgrid operates in an island mode. The energy management system can start the multifunctional battery or other power sources to dynamically match the load needs in the microgrid. This can help ensure the safety of the linemen working on grid lines. In some examples, such as examples without a power transfer switch, the command is sent to different power sources in the microgrid for stopping supplying power to the microgrid, in compliance with regulatory rules.

If the grid is stable, the energy management system supplies power to the loads, and charges the multifunctional battery using the bidirectional supply equipment (step 706). The energy management system also checks the power output of the microinverters (step 708). If the energy management system determines that the power output of microinverters is low (e.g., below a preset threshold), the energy management system enables the microgrid to draw power from the utility grid (e.g., through a smart meter, which may be equipped with voltage and current sensors) (step 710). The energy management system determines if a request for load shaving (e.g., peak load shaving) is received from the utility grid operator (step 712). If there is no request for load shaving from the utility grid, the energy management system continues to enable the microgrid to draw power from the utility grid (step 710). If the energy management system determines that it should perform load shaving, the energy management system sends one or more commands via a suitable communication channel to the bidirectional supply equipment to draw power from the multifunctional battery. That power can be used to supply the selected loads with power (step 714).

If the energy management system determines that the microinverters are producing surplus power (e.g., the microinverters are providing an amount of power that is greater than a preset threshold), the energy management system can send one or more commands via a suitable communication channel to enable the microinverters to send the surplus power to the utility grid (if permitted) or else manage the surplus power (step 716). This results in net-zero metering or grid peak limit shaving when commanded by the energy management system.

If the energy management system determines that the output of the microinverters is sufficient (e.g., the microinverters are providing an amount of power that is within a preset range), the energy management system can perform net-zero metering by checking available power from power sources in the microgrid (step 718). For example, the energy management system can send a command via a suitable communication channel to the bidirectional supply equipment to draw power from a backup battery and power loads instead of using grid power.

During nighttime as shown in FIG. 8, the microinverters associated with the solar panels may not supply power to the microgrid. In some such examples, the energy management system can check the grid stability continuously by monitoring the current and voltage sensor in the energy management system and/or in the smart meter (step 802), which is similar to step 702. If the grid is unstable, the energy management system sends one or more commands to some or all of the associated power supply systems (e.g., a backup battery) to shut down if the microgrid is connected to the utility grid (step 804). Alternatively, at step 804, the energy management system can disconnect the microgrid from the utility grid via the MID, and power managed loads from backup BESS or the multifunction battery via bidirectional supply equipment. If the grid is stable, the energy management system checks the available power of the multifunctional battery (step 806). If the available power of the multifunctional battery is not sufficient to power the loads in the microgrid (e.g., if the available power is less than the preset threshold level), the energy management system enables the grid to supply power to the loads. The energy management system may also charge the multifunctional battery from the grid. In some examples, time-of-use principles can be employed to reduce costs associated with charging the multifunctional battery (step 808).

Figure 9:
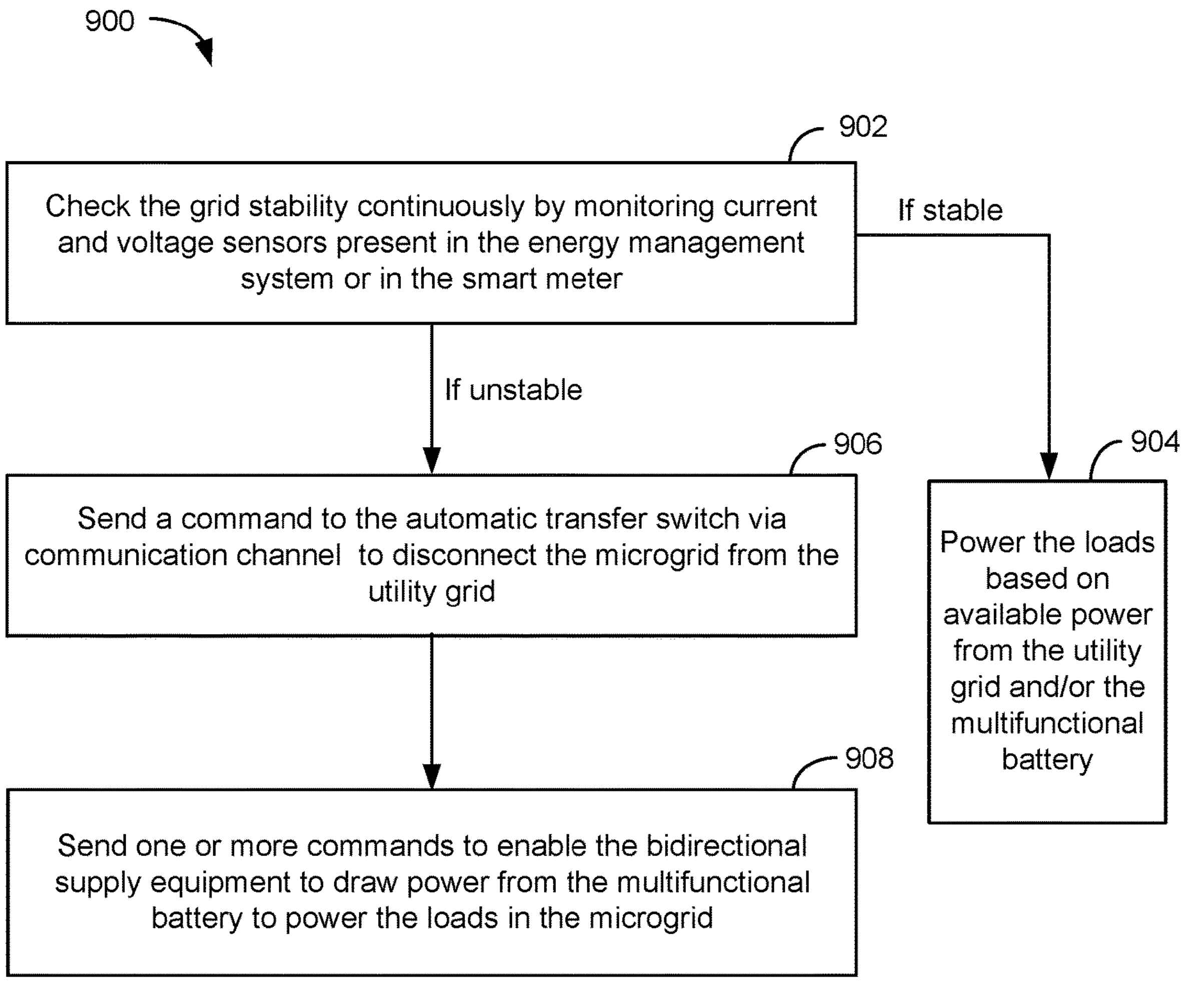
FIG. 9 is a flowchart of an example of a process performed by an energy management system for managing a grid-connected microgrid with a multifunctional battery but no other power sources when the grid is unstable according to some aspects of the present disclosure.
Figure 10:
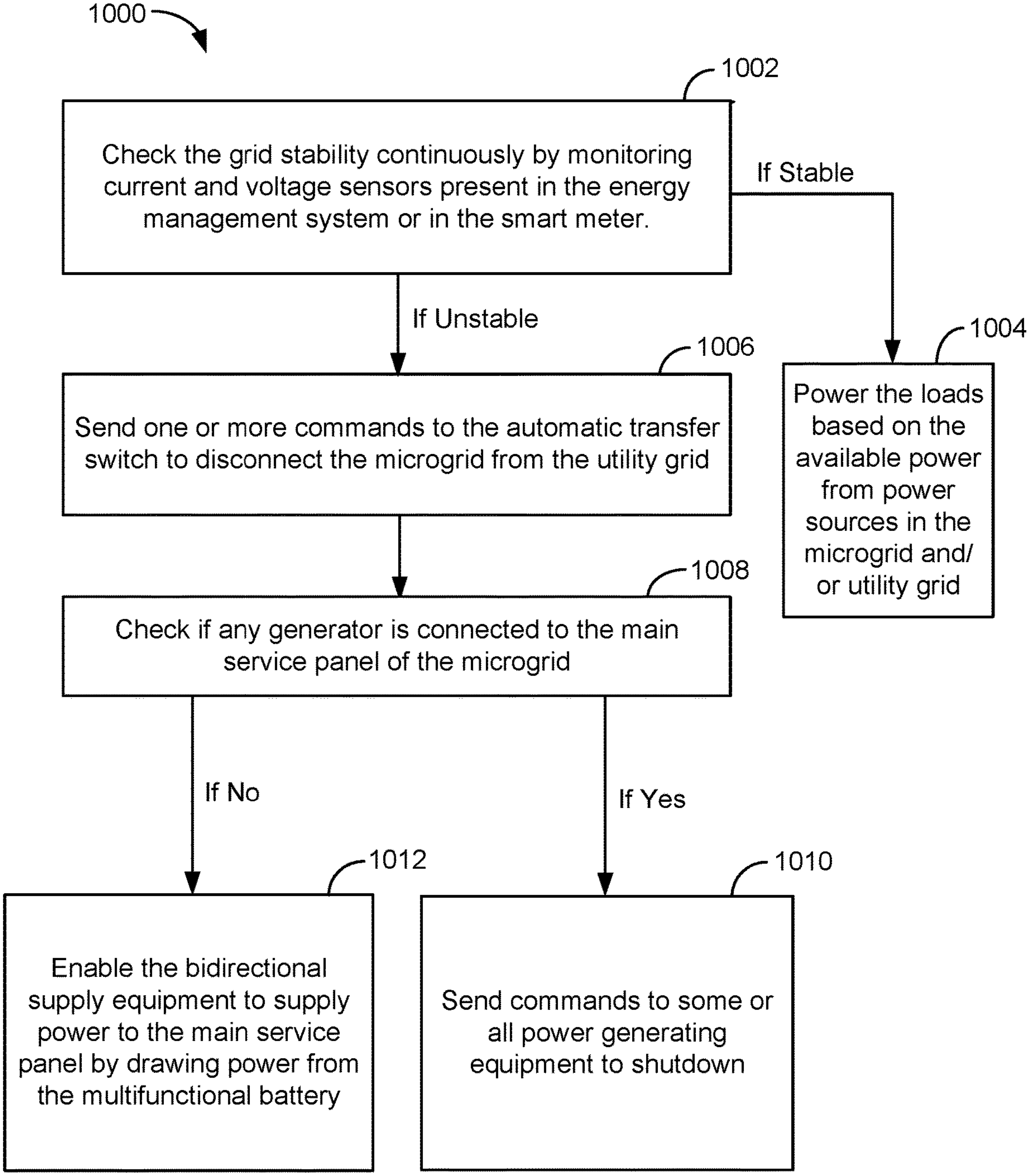
FIG. 10 is a flowchart of an example of a process performed by an energy management system for managing a grid-connected microgrid with a multifunctional battery and other power sources including a backup generator when the grid is unstable according to some aspects of the present disclosure.
Figure 11:
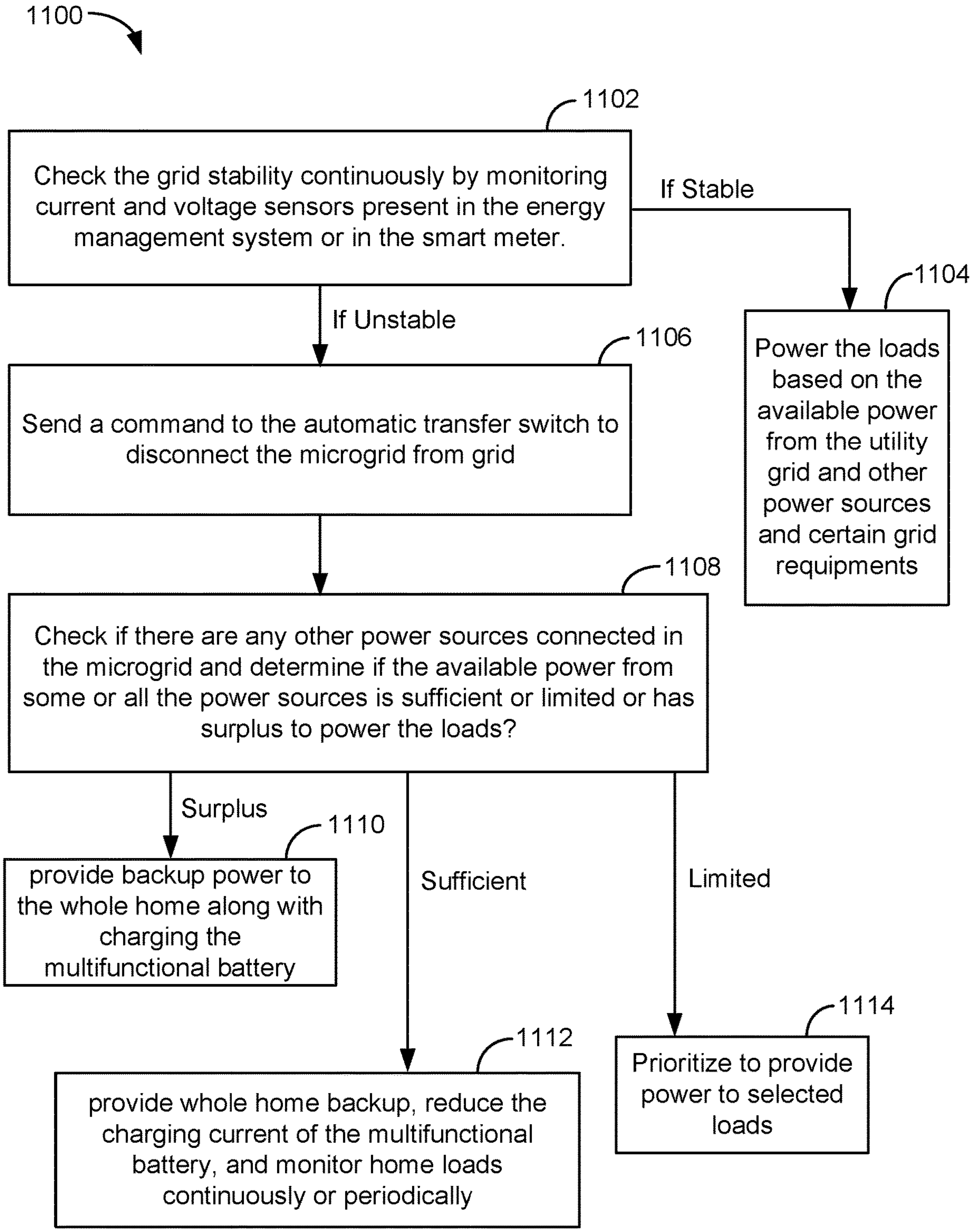
FIG. 11 is a flowchart of an example of a process performed by an energy management system for managing a grid-connected microgrid with a multifunctional battery and other power sources not including a backup generator when the grid is unstable according to some aspects of the present disclosure.
Figure 12:
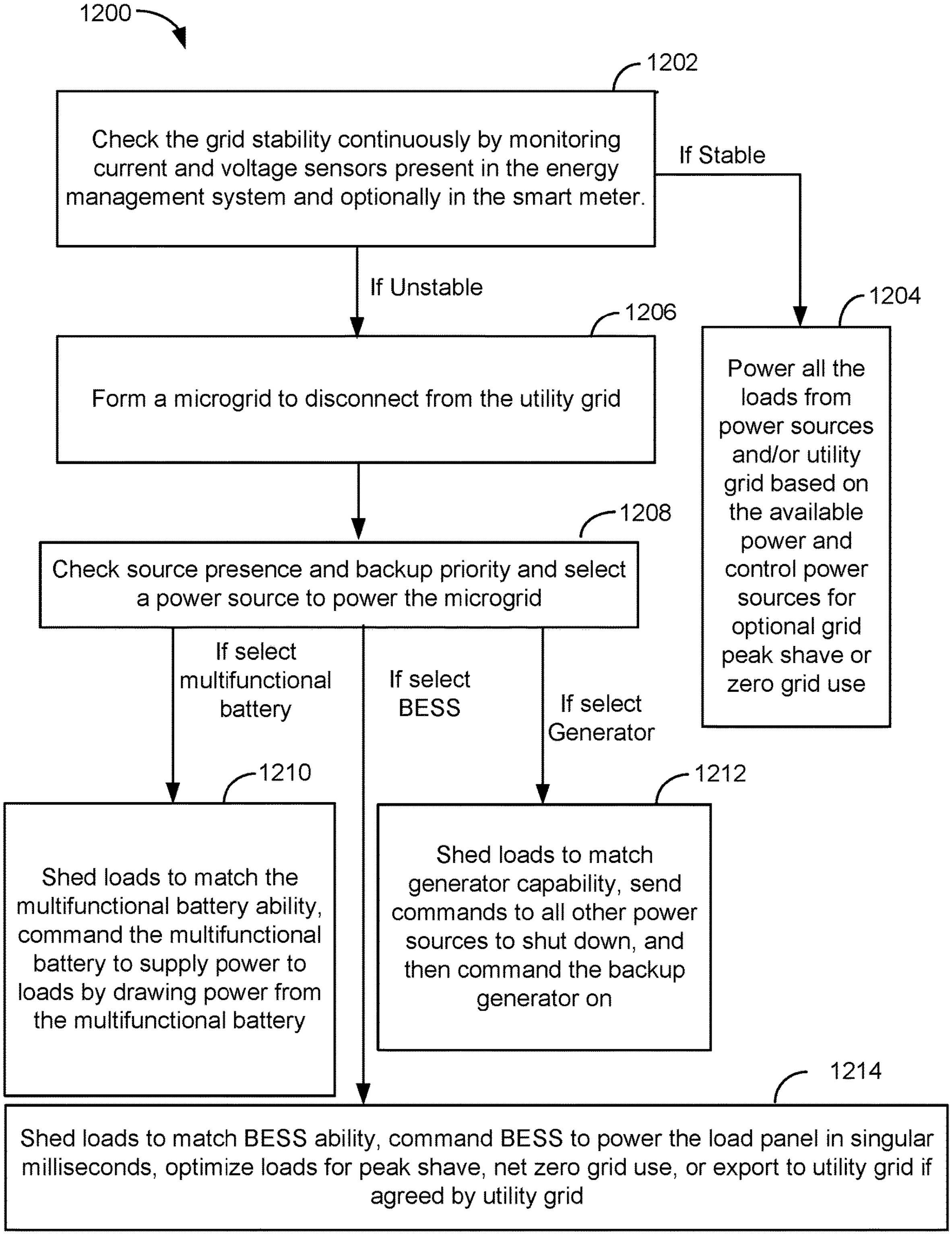
FIG. 12 a flowchart of an example of a process performed by an energy management system for managing a microgrid with multiple power sources when the grid is unstable according to some aspects of the present disclosure.

FIG. 9 is a flowchart of an example of a process 900 performed by an energy management system for managing a grid-connected microgrid with a multifunctional battery with bidirectional supply equipment but no other power sources when the grid is unstable according to some aspects of the present disclosure. FIG. 10 is a flowchart of an example of a process 1000 performed by an energy management system for managing a grid-connected microgrid with a multifunctional battery and other power sources including a backup generator when the grid is unstable according to some aspects of the present disclosure. FIG. 11 is a flowchart of an example of a process 1100 performed by an energy management system for managing a grid-connected microgrid with a multifunctional battery and other power sources not including a backup generator when the grid is unstable according to some aspects of the present disclosure. FIG. 12 a flowchart of an example of a process performed by an energy management system for managing a microgrid with multiple power sources when the grid is unstable according to some aspects of the present disclosure. In some examples, the flow charts illustrated in FIGS. 9-12 can be performed by the energy management system illustrated in FIG. 1.

The grid-connected microgrid in FIG. 9 includes a multifunctional battery with bidirectional supply equipment but without any other power sources. The energy management system checks the grid stability continuously by monitoring current and voltage sensors present in the energy management system and/or in the smart meter (step 902). If the grid is stable, the energy management system powers the loads in the microgrid based on available power from the grid and/or the multifunctional battery in the microgrid (904). If the energy management system detects that the grid is unstable, the energy management system can send a command to the automatic transfer switch via a suitable communication channel to disconnect the microgrid from the utility grid (step 906). The energy management system can then send one or more commands to the bidirectional supply equipment to draw power from the multifunctional battery to power the loads in the microgrid (step 908). The energy management system may also send one or more commands to the microinverters associated with the solar panels to draw power therefrom (e.g., during sunny conditions).

In a grid-tied microgrid with a multifunctional battery with bidirectional supply equipment and a backup generator as shown in FIG. 10, the energy management system checks the grid stability by monitoring current and voltage sensors present in the energy management system or in the smart meter (1002). If the grid is stable, the energy management system powers the loads in the microgrid based on available power from power sources in the microgrid and/or the utility grid (step 1004). If the grid is unstable, the energy management system sends one or more commands to the automatic transfer switch (e.g., via a cable over the bidirectional supply equipment) to disconnect the entire microgrid from the grid (1006). The energy management system can check the power generated at the microinverters, the power available with the multifunctional battery, and the loads continuously or periodically. The energy management system can also check if any generator is connected to the main service panel of the microgrid (1008). This can be achieved by the energy management system communicating with the main service panel. If the energy management system detects that there is a generator usable as backup and other power sources are not available, the energy management system can send commands via a suitable communication channel to some or all of the power generating equipment to shut down, to avoid damage to those sources due to the highly variable voltage of the generator (1010). The energy management system then sends commands to the generator to power on to provide building power.

If the energy management system detects that there is no generator connected to the main service panel and other sources are not available, the energy management system then can enable the bidirectional supply equipment (e.g., via Modbus or other communication means) to supply power to the main service panel by drawing power from the multifunctional battery (step 1012). In some examples in which the multifunctional battery's available charging level is below a certain threshold, the energy management system can determine whether all of the selected loads (e.g., essential loads) are powered. Based on determining that all the prioritized loads are powered, the energy management system can send commands to the bidirectional supply equipment to stop discharging the multifunctional battery. In some examples in which other power sources (e.g., such as solar panels connected with microinverters) generate power, the energy management system enables those power sources to provide energy to the loads in the microgrid. In some examples in which the loads are not getting enough power and the multifunctional battery charging is on, the energy management system can command the bidirectional supply equipment to draw less current using any suitable communications protocol, such as Modbus RTU, Modbus TCP, or secure Wi-Fi.

In a grid-tied microgrid including a multifunctional battery with bidirectional supply equipment and other power sources but without a backup generator as shown in FIG. 11, the energy management system checks the grid stability continuously by monitoring current and voltage sensors present in the energy management system or in the smart meter (step 1102). If the grid is stable, the energy management system powers the loads in the microgrid based on the available power from the grid and/or other power sources and certain grid requirements (step 1104). The microgrid can achieve net-zero metering by using the multifunctional power to provide power when feasible, by adding an AC battery of suitable size, or by adding a second bidirectional multifunctional battery. The energy management system can check the power availability from the power sources and intelligently send one or more commands to these sources to power the loads in the microgrid, thereby achieving net-zero metering.

If the grid is unstable, the energy management system sends a command to the smart automatic transfer switch (e.g., via a communication channel in communication with the multifunctional battery) to disconnect the entire microgrid from the grid (step 1106). The energy management system then checks if there are any other power sources connected in the microgrid and determines if the available power from some or all of those other power sources (e.g., microinverters connected with solar panels, multifunctional battery, AC battery, etc.) is sufficient or limited or has surplus for powering the loads (step 1108). If the power available from the other power sources has a surplus besides powering all the loads, the energy management system can provide backup power to the whole home (where the microgrid is located) along with charging the multifunctional battery (step 1110). The microgrid can achieve net-zero metering when commanded by the user or ADR utility. If the power available from all the power sources is sufficient to power all the loads, the energy management system can provide whole home backup, reduce the charging current of the multifunctional battery, and monitor the loads continuously or periodically (step 1112). This enables the energy management system to achieve backup for the whole microgrid. If the power available from all the power sources is limited for powering all the loads, the energy management system can prioritize providing power to selected loads (e.g., essential loads) in the microgrid (1114).

FIG. 12 a flowchart of an example of a process performed by an energy management system for managing a microgrid with multiple power sources when the grid is unstable according to some aspects of the present disclosure. At step 1202, the energy management system checks the grid stability continuously by monitoring current and voltage sensors present in the energy management system and optionally in the smart meter. If the utility grid is stable, the energy management system powers all the loads from power sources and/or the utility grid based on the available power and control the power sources for optional grid peak shave or zero grid use (step 1204). If the utility grid is unstable, the energy management system forms a microgrid with the power sources and loads and disconnect the microgrid from the utility grid (step 1206). The energy management system then checks source presence and backup priority, and selects a power source to power the microgrid (step 1208). The power sources in the microgrid can include a multifunctional battery, a BESS, a backup generator. If the energy management system selects the multifunctional battery, the energy management system sheds certain loads in the microgrid to match the multifunctional battery ability, commands the multifunctional battery to supply power to lads by drawing power from the multifunctional battery (step 1210). If the energy management system selects the backup generator, the energy management system shed loads to match the generator capability, send commands to all other power sources to shut down, and then command the backup generator on (step 1212). If the energy management system selects the BESS, the energy management system can shed loads to match the BESS ability, command the BESS to power the load panel in singular seconds, and optimize the loads for peak shave, net zero grid use, or export to the utility grid if agreed by the utility grid (step 1214.)

FIGS. 7-12 are presented as examples of how the energy management system can control and manage the supply and load in the microgrid. They should not be construed as limiting and it will be appreciated that various aspects of FIGS. 7-12 may be combined with one another or employed at different times by the energy management system, to provide a more comprehensive coverage in various operating scenarios. Using the techniques described herein, the energy management system can provide controlled transition to an off-grid scenario for a microgrid, including a set of solar panels, a stationary battery, a mobile battery, an energy management system, a main service panel, and a plurality of building loads. The set of solar panels are equipped with microinverters that convert DC to AC electricity. The plurality of building loads can be connected to both the utility grid and the local power network (microgrid). One or more commands can be generated and transmitted to the microinverters via a proper communication channel to divert surplus power generated by the said microinverters to additional loads without shutting down the microinverters. In some examples, the additional loads may include one or more of space heating, water heating, or the building loads that have low priority or the electric/hybrid vehicle battery during charging or a stationary AC battery during charging.

Figure 13:
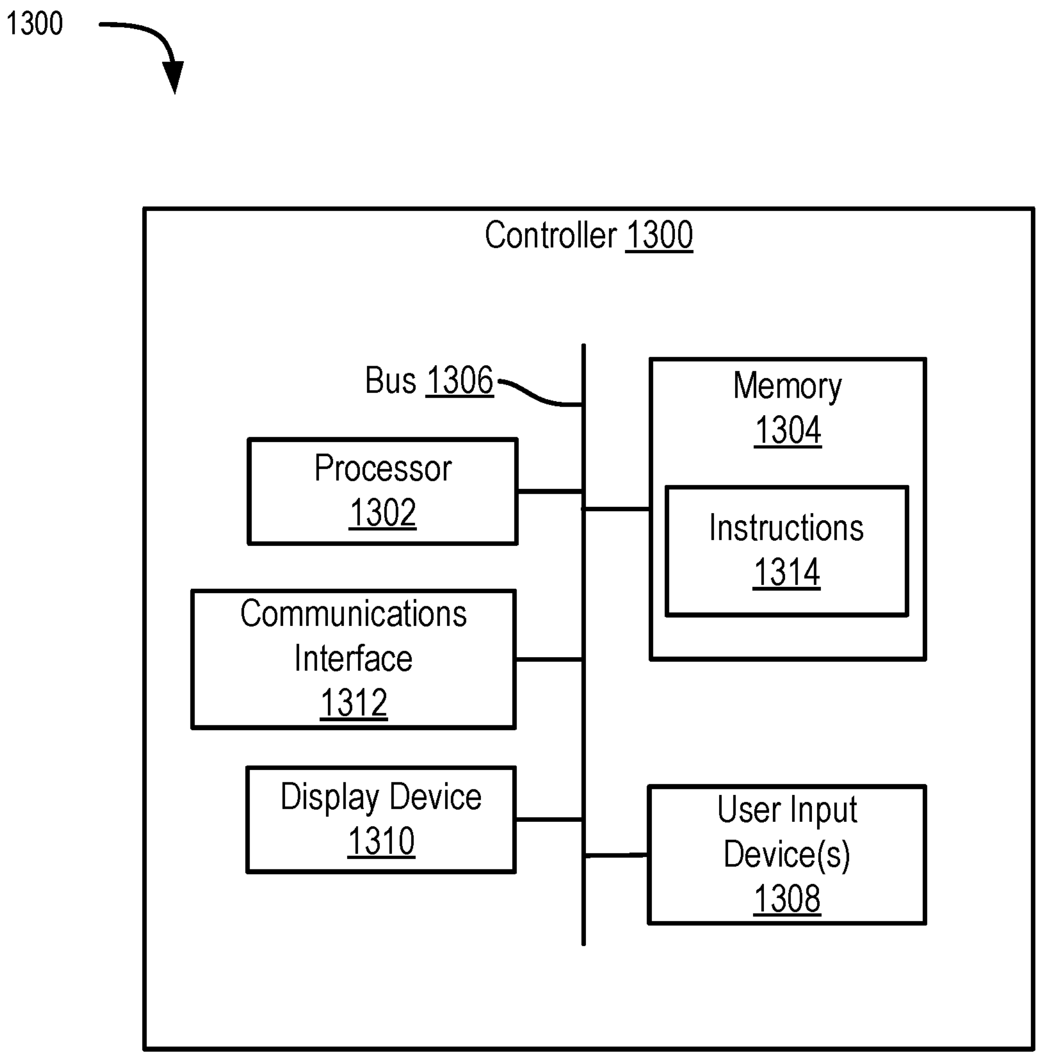
FIG. 13 is a block diagram illustrating a computing device according to some aspects of the present disclosure.

FIG. 13 is a block diagram illustrating a computing device according to some aspects of the present disclosure. The computing device 1300 can be usable to implement some aspects of the present disclosure is shown. In some examples, the computing device 1300 may correspond to an MCU 116 of FIG. 1.

The computing device 1300 includes a processor 1302 that is in communication with the memory 1304 and other components of the computing device 1300 using one or more communications buses 1306. The processor 1302 is hardware that can include one processing device or multiple processing devices. Examples of the processor 1302 can include a Field-Programmable Gate Array (FPGA), an application-specific integrated circuit (ASIC), or a microprocessor. The processor 1302 is configured to execute processor-executable instructions 1314 stored in the memory 1304 to perform one or more processes described herein. The instructions 1314 may include processor-specific instructions generated by a compiler or an interpreter from code written in any suitable computer-programming language, such as C, C++, C #, Java, or Python.

The memory 1304 is hardware that can include one memory device or multiple memory devices. The memory 1304 can be volatile or non-volatile (it can retain stored information when powered off). Examples of the memory 1304 include electrically erasable and programmable read-only memory (EEPROM), flash memory, or cache memory. At least some of the memory 1304 includes a non-transitory computer-readable medium from which the processor 1302 can read instructions 1314. A computer-readable medium can include electronic, optical, magnetic, or other storage devices capable of providing the processor 1302 with the instructions 1314 or other program code. Examples of a computer-readable mediums include magnetic disks, memory chips, ROM, random-access memory (RAM), an ASIC, a configured processor, and optical storage.

The computing device 1300 may include one or more user input devices 1308 (e.g., a keyboard, mouse, touchscreen, video capture device, and/or microphone) to accept user input and the display device 1310 to provide visual output to a user.

The computing device 1300 may further include a communications interface 1312. In some examples, the communications interface 1312 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

Various examples of the present disclosure are provided below. As used below, any reference to a series of examples is to be understood as a reference to each of those examples disjunctively (e.g., "Examples 1-4" is to be understood as "Examples 1, 2, 3, or 4").

Example 1 is an energy management system, comprising: one or more relay switches configured to connect with one or more power sources and one or more load devices in a microgrid correspondingly; a microgrid interconnection device configured to connect with or disconnect from a utility grid; and one or more microcontroller units, wherein the one or more microcontroller units comprises: one or more processors; and a non-transitory computer-readable medium comprising program code that is executable by the one or more processors to: monitor the microgrid using multiple sensors, wherein the multiple sensors are associated with the utility grid and the one or more relay switches; determine one or more load profiles corresponding to the one or more load devices in the microgrid based on measurements from the multiple sensors; determine a priority order of the one or more load devices in the microgrid based on the load profiles corresponding to the one or more load devices; and dynamically connect and disconnect the one or more load devices and the one or more power sources based on a utility grid condition, the one or more load profiles, and the priority order of the one or more load devices.

Example 2 is the energy management system of example 1, wherein the one or more power sources comprise a set of solar panels connected to the energy management system via at least one microinverter, wherein the at least one microinverter is connected to at least one relay switch coupled with a current sensor and a voltage sensor, wherein the non-transitory computer-readable medium further comprises program code that is executable by the one or more processors to: determine an available power from the set of solar panels by communicating with the at least one microinverter and the current sensor and the voltage sensor coupled with the at least one relay switch connected to the at least one microinverter.

Example 3 is the energy management system of example(s) 1-2, wherein the one or more power sources further comprises one or more multifunctional batteries connected with the energy management system via bidirectional supply equipment, wherein the one or more multifunctional batteries are coupled to one or more inverters, wherein the non-transitory computer-readable medium further comprises program code that is executable by the one or more processors to enable charging at least one of the one or more multifunctional batteries in response to determining the available power from the set of solar panels is more than a total load value of the one or more load devices in the microgrid.

Example 4 is the energy management system of example(s) 1-3, wherein the non-transitory computer-readable medium further comprises program code that is executable by the one or more processors to enable at least one of the one or more multifunctional batteries to discharge to the microgrid in response to determining the available power from the set of solar panels is less than the total load value of the one or more load devices in the microgrid.

Example 5 is the energy management system of example(s) 1-4, wherein the non-transitory computer-readable medium further comprises program code that is executable by the one or more processors to connect an additional load device to the microgrid in response to determining a total available power from the one or more power sources is greater than a total load value of the one or more load devices in the microgrid.

Example 6 is the energy management system of example(s) 1-5, wherein the non-transitory computer-readable medium further comprises program code that is executable by the one or more processors to disconnect a load device from the microgrid based on the priority order of the one or more load devices, in response to determining a total available power from the one or more power sources is less than a total load value of the one or more load devices in the microgrid.

Example 7 is the energy management system of example(s) 1-6, wherein each relay switch is associated with a current sensor configured to collect current data associated with a corresponding power source or load device connected to the relay switch, wherein the current sensor is located at a predetermined distance from a corresponding relay switch, the predetermined distance being operable to maintain the current sensor within a predetermined temperature range.

Example 8 is the energy management system of example(s) 1-7, wherein the non-transitory computer-readable medium further comprises program code that is executable by the one or more processors to determine the priority order of the one or more load devices in the microgrid based on a user input.

Example 9 is the energy management system of example(s) 1-8, wherein the non-transitory computer-readable medium further comprises program code that is executable by the one or more processors to: determine a plurality of power consumption parameters associated with a load device based on the measurements collected during a predetermined time interval; and determine a load profile for the load device based on the plurality of power consumption parameters using a machine learning model.

Example 10 is the energy management system of example(s) 1-9, wherein the plurality of power consumption parameters comprises an instantaneous power, an average power over a first time window, an average power over a second predefined time window that is smaller than the first time window, a maximum power over a third time window, a peak power during a fourth time window starting from the load device being turned on, or any combination thereof.

Example 11 is the energy management system of example(s) 1-10, wherein the non-transitory computer-readable medium further comprises program code that is executable by the one or more processors to determine a peak load value and a steady state load value based on the plurality of power consumption parameters, wherein the load profile comprises the peak load value and the steady state load value.

Example 12 is the energy management system of example(s) 1-11, wherein the non-transitory computer-readable medium further comprises program code that is executable by the one or more processors to adjust the load profile based on updates of the plurality of power consumption parameters.

Example 13 is the energy management system of example(s) 1-12, wherein the non-transitory computer-readable medium further comprises program code that is executable by the one or more processors to determine a load profile corresponding to a load device in the microgrid based on an identification of a load circuit in the microgrid comprising the load device.

Example 14 is the energy management system of example(s) 1-13, wherein the one or more microcontroller units are configured to communicate with a remote server, wherein the remote server is configured to provide an interface for a user device to communicate with the energy management system.

Example 15 is the energy management system of example(s) 1-14, wherein the one or more relay switches are coupled to one or more relay boards, the microgrid interconnection device is coupled to a microgrid interconnection device board, and the one or more microcontroller units are coupled to a control board; wherein the one or more relay boards, the microgrid interconnection device board, and the control board are enclosed in a metal enclosure; and wherein the control board is mounted in the metal enclosure separately from the relay board and the microgrid interconnection device board.

Example 16 is the energy management system of example(s) 1-15, wherein the metal enclosure is connected to the one or more relay boards and the microgrid interconnection device via one or more thermal pads.

Example 17 is the energy management system of example(s) 1-16, wherein the non-transitory computer-readable medium further comprises program code that is executable by the one or more processors to: monitor a relay temperature associated with a relay switch using a temperature sensor; determine a thermal trend based on the relay temperature over a period of time; determine that a temperature increase associated with the relay switch during a predetermined period of time meets or exceeds a predetermined threshold; and based on determining that the temperature increase meets or exceeds the predetermined threshold, transmit an alert message indicating an abnormal condition of the relay switch to a user device.

Example 18 is the energy management system of example(s) 1-17, wherein the non-transitory computer-readable medium further comprises program code that is executable by the one or more processors to open the relay switch in response to determining the temperature increase associated with the relay switch during the predetermined period of time meets or exceeds the predetermined threshold.

Example 19 is the energy management system of example(s) 1-18, wherein the non-transitory computer-readable medium further comprises program code that is executable by the one or more processors to calibrate relay switching time for opening or closing a relay switch based on (i) a control signal to open or close the relay switch, (ii) an estimated relay aging condition, and (iii) voltage and current data associated with the relay switch.

Example 20 is the energy management system of example(s) 1-19, further comprising a battery configured to power the one or more microcontroller units, wherein the non-transitory computer-readable medium further comprises program code that is executable by the one or more processors to periodically verify a capacity of a battery powering the one or more microcontroller units by draining the battery and recharging the battery at a predetermined time interval.

Example 21 is the energy management system of example(s) 1-20, wherein the non-transitory computer-readable medium further comprises program code that is executable by the one or more processors to identify one or more phases that the one or more load devices are connected to respectively.

Example 22 is a method comprising: monitoring, by an energy management system, a microgrid using multiple sensors, wherein the multiple sensors are associated with a utility grid, one or more power sources in the microgrid, and one or more load devices in the microgrid; determining, by the energy management system, one or more load profiles corresponding to the one or more load devices in the microgrid based on measurements from the multiple sensors; determining, by the energy management system, a priority order of the one or more load devices in the microgrid based on the one or more load profiles corresponding to the one or more power sources; and dynamically connecting and disconnecting, by the energy management system, the one or more power sources and the one or more load devices based on a utility grid condition, available powers from the one or more power sources, the one or more load profiles, and the priority order of the one or more load devices.

Example 23 is the method of example 22, wherein the one or more power sources comprise a set of solar panels connected to the energy management system via at least one microinverter, wherein the at least one microinverter is connected to at least one relay switch coupled with a current sensor and a voltage sensor, wherein the method further comprises: determining an available power from the set of solar panels by communicating with the at least one microinverter and the current sensor and the voltage sensor coupled with the at least one relay switch connected to the at least one microinverter.

Example 24 is the method of example(s) 22-23, wherein the one or more power sources further comprises one or more batteries connected with the energy management system via bidirectional supply equipment, wherein the method further comprises: enabling charging at least one of the one or more batteries in response to determining the available power from the set of solar panels in response to determining the available power from the set of solar panels is more than a total load value of the one or more load devices in the microgrid.

Example 25 is the method of example(s) 22-24, wherein enabling charging at least one of the one or more batteries comprises providing a predetermined current to at least one of the one or more batteries.

Example 26 is the method of example(s) 22-25, further comprising enabling discharging at least one of the one or more batteries to the microgrid in response to determining the available power from the set of solar panels is less than the total load value of the one or more load devices in the microgrid.

Example 27 is the method of example(s) 22-26, wherein enabling discharging at least one of the one or more batteries to the microgrid comprises providing a predetermined current to the microgrid from the at least one of the one or more batteries.

Example 28 is the method of example(s) 22-27, further comprising connecting an additional load device to the microgrid in response to determining a total available power from the one or more power sources is greater than a total load value of the one or more load devices in the microgrid.

Example 29 is the method of example(s) 22-28, further comprising disconnecting a load device to the microgrid based on the priority order of the one or more load devices, in response to determining a total available power from the one or more power sources is less than a total load value of the one or more load devices in the microgrid.

Example 30 is the method of example(s) 22-29, further comprising determining the priority order of the one or more load devices in the microgrid based on a user input.

Example 31 is the method of example(s) 22-30, further comprising: determining a plurality of power consumption parameters associated with a load device based on the measurements collected during a predetermined time interval; and determining a load profile for the load device based on the plurality of power consumption parameters using a machine learning model.

Example 32 is the method of example(s) 22-31, further comprising determining a load profile corresponding to a load device in the microgrid based on an identification of a load circuit in the microgrid comprising the load device.

Example 33 is the method of example(s) 22-32, further comprising: monitoring a relay temperature associated with a relay switch using a temperature sensor; determining a thermal trend based on the relay temperature over a predetermined period of time; determining that a temperature increase associated with the relay switch during a predetermined period of time meets or exceeds a predetermined threshold; and based on determining that the temperature increase meets or exceeds the predetermined threshold, transmitting an alert message indicating an abnormal condition of the relay switch to a user device.

Example 34 is the method of example(s) 22-33, further comprising opening the relay switch in response to determining the temperature increase associated with the relay switch during the predetermined period of time meets or exceeds the predetermined threshold.

Example 35 is the method of example(s) 22-34, further comprising calibrating relay switching time for opening or closing a relay switch based on (i) a control signal to open or close the relay switch, (ii) an estimated relay aging condition, and (iii) voltage and current data associated with the relay switch.

Example 36 is the method of example(s) 22-35, further comprising verifying periodically a capacity of a battery powering the energy management system by draining the battery and recharging the battery at a predetermined time interval.

Example 37 is the method of example(s) 22-36, further comprising identifying one or more phases that the one or more load devices are connected to respectively.

Example 38 is non-transitory computer-readable medium comprising program code that is executable by one or more processors to: monitor a microgrid using multiple sensors, wherein the multiple sensors are associated with a utility grid, one or more power sources in the microgrid, and one or more load devices in the microgrid; determine one or more load profiles corresponding to the one or more load devices in the microgrid based on measurements from the multiple sensors; determine a priority order of the one or more load devices in the microgrid based on the one or more load profiles corresponding to the one or more power sources; and dynamically connect and disconnect the one or more power sources and the one or more load devices based on a utility grid condition, available powers from the one or more power sources, the one or more load profiles, and the priority order of the one or more load devices.

Example 39 is the non-transitory computer-readable medium of example 38, further comprising program code that is executable by the one or more processors to connect an additional load device to the microgrid in response to determining a total available power from the one or more power sources is greater than a total load value of the one or more load devices in the microgrid.

Example 40 is the non-transitory computer-readable medium of example(s) 38-39, further comprising program code that is executable by the one or more processors to disconnect a load device to the microgrid based on the priority order of the one or more load devices, in response to determining a total available power from the one or more power sources is less than a total load value of the one or more load devices in the microgrid.

Example 41 is the non-transitory computer-readable medium of example(s) 38-40, further comprising program code that is executable by the one or more processors to determine the priority order of the one or more load devices in the microgrid based on a user input.

Example 42 is the non-transitory computer-readable medium of example(s) 38-41, further comprising program code that is executable by the one or more processors to: determine a plurality of power consumption parameters associated with a load device based on the measurements collected during a predetermined time interval; and determine a load profile for the load device based on the plurality of power consumption parameters using a machine learning model.

Example 43 is the non-transitory computer-readable medium of example(s) 38-42, further comprising program code that is executable by the one or more processors to determine a load profile corresponding to a load device in the microgrid based on an identification of a load circuit in the microgrid comprising the load device.

Example 44 is the non-transitory computer-readable medium of example(s) 38-43, further comprising program code that is executable by the one or more processors to: monitor a relay temperature associated with a relay switch using a temperature sensor; determine a thermal trend based on the relay temperature over a period of time; determine that a temperature increase associated with the relay switch during a predetermined period of time meets or exceeds a predetermined threshold; and based on determining that the temperature increase meets or exceeds the predetermined threshold, transmit an alert message indicating an abnormal condition of the relay switch to a user device.

Example 45 is the non-transitory computer-readable medium of example(s) 38-44, further comprising program code that is executable by the one or more processors to open the relay switch in response to determining the temperature increase associated with the relay switch during the predetermined period of time meets or exceeds the predetermined threshold.

Example 46 is the non-transitory computer-readable medium of example(s) 38-45, further comprising program code that is executable by the one or more processors to calibrate relay switching time for opening or closing a relay switch based on (i) a control signal to open or close the relay switch, (ii) an estimated relay aging condition, and (iii) voltage and current data associated with the relay switch.

Example 47 is the non-transitory computer-readable medium of example(s) 38-46, further comprising program code that is executable by the one or more processors to identify one or more phases that the one or more load devices are connected to respectively.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

It is also understood that the examples and embodiments described herein are for illustrative purposes only and that various modifications or changes in light thereof will be suggested to persons skilled in the art and are to be included within the spirit and purview of this application and scope of the appended claims, which follow.

What is claimed is:

1. An energy management system, comprising:
- one or more relay switches configured to connect with one or more power sources and one or more load devices in a microgrid correspondingly;
- a microgrid interconnection device configured to connect with or disconnect from a utility grid; and
- one or more microcontroller units, wherein the one or more microcontroller units comprises:
  - one or more processors; and
  - a non-transitory computer-readable medium comprising program code that is executable by the one or more processors to:
    - monitor the microgrid using multiple sensors, wherein the multiple sensors are associated with the utility grid and the one or more relay switches;
    - determine one or more load profiles corresponding to the one or more load devices in the microgrid based on measurements from the multiple sensors, wherein the one or more load profiles comprise one or more load curves associated with the one or more load devices over a period of time based on the measurements from the multiple sensors;

determine a priority order of the one or more load devices in the microgrid based on the one or more load profiles corresponding to the one or more load devices; and dynamically connect and disconnect the one or more load devices and the one or more power sources based on a utility grid condition, the one or more load profiles, and the priority order of the one or more load devices.

2. The energy management system of claim 1, wherein the one or more power sources comprise a set of solar panels connected to the energy management system via at least one microinverter, wherein the at least one microinverter is connected to at least one relay switch coupled with a current sensor and a voltage sensor, wherein the non-transitory computer-readable medium further comprises program code that is executable by the one or more processors to:

determine an available power from the set of solar panels by communicating with the at least one microinverter and the current sensor and the voltage sensor coupled with the at least one relay switch connected to the at least one microinverter.

3. The energy management system of claim 2, wherein the one or more power sources further comprises one or more multifunctional batteries connected with the energy management system via bidirectional supply equipment, wherein the one or more multifunctional batteries are coupled to one or more inverters, wherein the non-transitory computer-readable medium further comprises program code that is executable by the one or more processors to enable charging at least one of the one or more multifunctional batteries in response to determining the available power from the set of solar panels is more than a total load value of the one or more load devices in the microgrid.

4. The energy management system of claim 3, wherein the non-transitory computer-readable medium further comprises program code that is executable by the one or more processors to enable at least one of the one or more multifunctional batteries to discharge to the microgrid in response to determining the available power from the set of solar panels is less than the total load value of the one or more load devices in the microgrid.

5. The energy management system of claim 1, wherein the non-transitory computer-readable medium further comprises program code that is executable by the one or more processors to connect an additional load device to the microgrid in response to determining a total available power from the one or more power sources is greater than a total load value of the one or more load devices in the microgrid.

6. The energy management system of claim 1, wherein the non-transitory computer-readable medium further comprises program code that is executable by the one or more processors to disconnect a load device from the microgrid based on the priority order of the one or more load devices, in response to determining a total available power from the one or more power sources is less than a total load value of the one or more load devices in the microgrid.

7. The energy management system of claim 1, wherein each relay switch is associated with a current sensor configured to collect current data associated with a corresponding power source or load device connected to the relay switch, wherein the current sensor is located at a predetermined distance from a corresponding relay switch, the predetermined distance being operable to maintain the current sensor within a predetermined temperature range.

8. The energy management system of claim 1, wherein the non-transitory computer-readable medium further comprises program code that is executable by the one or more processors to determine the priority order of the one or more load devices in the microgrid based on a user input.

9. The energy management system of claim 1, wherein the non-transitory computer-readable medium further comprises program code that is executable by the one or more processors to determine a load profile corresponding to a load device in the microgrid based on an identification of a load circuit in the microgrid comprising the load device.

10. The energy management system of claim 1, wherein the one or more relay switches are coupled to one or more relay boards, the microgrid interconnection device is coupled to a microgrid interconnection device board, and the one or more microcontroller units are coupled to a control board;

wherein the one or more relay boards, the microgrid interconnection device board, and the control board are enclosed in a metal enclosure; and wherein the control board is mounted in the metal enclosure separately from the relay board and the microgrid interconnection device board.

11. The energy management system of claim 10, wherein the metal enclosure is connected to the one or more relay boards and the microgrid interconnection device via one or more thermal pads.

12. The energy management system of claim 1, wherein the non-transitory computer-readable medium further comprises program code that is executable by the one or more processors to:

monitor a relay temperature associated with a relay switch using a temperature sensor;

determine a thermal trend based on the relay temperature over a period of time;

determine that a temperature increase associated with the relay switch during a predetermined period of time meets or exceeds a predetermined threshold; and based on determining that the temperature increase meets or exceeds the predetermined threshold, transmit an alert message indicating an abnormal condition of the relay switch to a user device.

13. The energy management system of claim 12, wherein the non-transitory computer-readable medium further comprises program code that is executable by the one or more processors to open the relay switch in response to determining the temperature increase associated with the relay switch during the predetermined period of time meets or exceeds the predetermined threshold.

14. The energy management system of claim 1, wherein the non-transitory computer-readable medium further comprises program code that is executable by the one or more processors to calibrate relay switching time for opening or closing a relay switch based on (i) a control signal to open or close the relay switch, (ii) an estimated relay aging condition, and (iii) voltage and current data associated with the relay switch.

15. The energy management system of claim 1, further comprising a battery configured to power the one or more microcontroller units, wherein the non-transitory computer-readable medium further comprises program code that is executable by the one or more processors to periodically verify a capacity of a battery powering the one or more microcontroller units by draining the battery and recharging the battery at a predetermined time interval.

16. The energy management system of claim 1, wherein the non-transitory computer-readable medium further comprises program code that is executable by the one or more processors to identify one or more phases that the one or more load devices are connected to respectively.

17. An energy management system, comprising:

one or more relay switches configured to connect with one or more power sources and one or more load devices in a microgrid correspondingly;

a microgrid interconnection device configured to connect with or disconnect from a utility grid; and one or more microcontroller units, wherein the one or more microcontroller units comprises:

one or more processors; and a non-transitory computer-readable medium comprising program code that is executable by the one or more processors to:

monitor the microgrid using multiple sensors, wherein the multiple sensors are associated with the utility grid and the one or more relay switches;

determine one or more load profiles corresponding to the one or more load devices in the microgrid based on measurements from the multiple sensors collected during a predetermined time interval;

determine a plurality of power consumption parameters associated with the one or more load devices based on the measurements;

update the one or more load profiles based on the plurality of power consumption parameters using a machine learning model;

determine a priority order of the one or more load devices in the microgrid based on the load profiles corresponding to the one or more load devices; and dynamically connect and disconnect the one or more load devices and the one or more power sources based on a utility grid condition, the one or more load profiles, and the priority order of the one or more load devices.

18. The energy management system of claim 17, wherein the plurality of power consumption parameters comprises an instantaneous power, an average power over a first time window, an average power over a second predefined time window that is smaller than the first time window, a maximum power over a third time window, a peak power during a fourth time window starting from the one or more load devices being turned on, or any combination thereof.

19. The energy management system of claim 17, wherein the non-transitory computer-readable medium further comprises program code that is executable by the one or more processors to determine a peak load value and a steady state load value based on the plurality of power consumption parameters, wherein the one or more load profiles comprises the peak load value and the steady state load value.

20. The energy management system of claim 17, wherein the non-transitory computer-readable medium further comprises program code that is executable by the one or more processors to adjust the one or more load profiles based on updates of the plurality of power consumption parameters.

* * * * *